United States Patent
Abotabl et al.

(10) Patent No.: US 12,445,986 B2
(45) Date of Patent: Oct. 14, 2025

(54) TECHNIQUES FOR BEAM FAILURE DETECTION BASED ON NETWORK ENERGY MODES IN WIRELESS COMMUNICATIONS

(71) Applicant: QUALCOMM Incorporated, San Diego, CA (US)

(72) Inventors: Ahmed Attia Abotabl, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 18/192,634

(22) Filed: Mar. 29, 2023

(65) Prior Publication Data

US 2024/0334352 A1 Oct. 3, 2024

(51) Int. Cl.
*H04W 56/00* (2009.01)
*H04W 76/19* (2018.01)

(52) U.S. Cl.
CPC ....... *H04W 56/0015* (2013.01); *H04W 76/19* (2018.02)

(58) Field of Classification Search
CPC .......................... H04W 56/0015; H04W 76/19
See application file for complete search history.

(56) References Cited

U.S. PATENT DOCUMENTS

| | | | |
|---|---|---|---|
| 2020/0288503 A1* | 9/2020 | Sahlin | H04W 16/28 |
| 2023/0189347 A1* | 6/2023 | Xiong | H04W 74/0891 370/329 |
| 2023/0337020 A1* | 10/2023 | Da Silva | H04W 24/04 |
| 2024/0298263 A1* | 9/2024 | Esswie | H04W 52/0232 |

* cited by examiner

*Primary Examiner* — Walli Z Butt
(74) *Attorney, Agent, or Firm* — Dalei Dong; Holland & Hart LLP

(57) ABSTRACT

Methods, systems, and devices for wireless communications are described for multiple network energy modes at a network entity, where different network energy modes are associated with different energy consumption. A network entity may provide, and a user equipment (UE) may receive, configuration information for a set of synchronization signal block (SSB) transmissions, where different subsets of SSBs use different network energy modes. A UE may measure one or more parameters for at least a first SSB, and initiate a beam failure recovery (BFR) procedure based at least in part on the network energy mode associated with the first SSB and a threshold value associated with the one or more parameters. In some aspects, different SSBs associated with different network energy modes may use different parameter thresholds for initiating the BFR procedure.

30 Claims, 19 Drawing Sheets

(1)

TECHNIQUES FOR BEAM FAILURE DETECTION BASED ON NETWORK ENERGY MODES IN WIRELESS COMMUNICATIONS

FIELD OF TECHNOLOGY

The following relates to wireless communications, including techniques for beam failure detection based on network energy modes in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for beam failure detection based on network energy modes in wireless communications. For example, the described techniques provide for multiple operation modes (e.g., network energy saving (NES) modes) at a network entity, where different operation modes are associated with different energy consumption. In accordance with various aspects, a network entity may provide, and a user equipment (UE) may receive, configuration information for a set of synchronization signal block (SSB) transmissions, where different subsets of SSBs use different network energy modes. A UE may measure one or more parameters for at least a first SSB, and initiate a beam failure recovery (BFR) procedure based at least in part on the network energy mode associated with the first SSB and a threshold value associated with the one or more parameters. In some aspects, different SSBs associated with different network energy modes may use different parameter thresholds for initiating the BFR procedure.

A method for wireless communication at a UE is described. The method may include receiving configuration information for a set of multiple SSB transmissions, where a first subset of SSBs of the set of multiple SSB transmissions use a first network energy mode and a second subset of SSBs of the set of multiple SSB transmissions use a second network energy mode, measuring at least a first parameter for at least a first SSB of the set of multiple SSB transmissions, and initiating a beam failure recovery procedure based on whether the first SSB is included in the first subset of SSBs or the second subset of SSBs, and the first parameter having a measured value that is below a threshold value.

An apparatus for wireless communication at a UE is described. The apparatus may include a processor, memory coupled with the processor, and instructions stored in the memory. The instructions may be executable by the processor to cause the apparatus to receive configuration information for a set of multiple SSB transmissions, where a first subset of SSBs of the set of multiple SSB transmissions use a first network energy mode and a second subset of SSBs of the set of multiple SSB transmissions use a second network energy mode, measure at least a first parameter for at least a first SSB of the set of multiple SSB transmissions, and initiate a beam failure recovery procedure based on whether the first SSB is included in the first subset of SSBs or the second subset of SSBs, and the first parameter having a measured value that is below a threshold value.

Another apparatus for wireless communication at a UE is described. The apparatus may include means for receiving configuration information for a set of multiple SSB transmissions, where a first subset of SSBs of the set of multiple SSB transmissions use a first network energy mode and a second subset of SSBs of the set of multiple SSB transmissions use a second network energy mode, means for measuring at least a first parameter for at least a first SSB of the set of multiple SSB transmissions, and means for initiating a beam failure recovery procedure based on whether the first SSB is included in the first subset of SSBs or the second subset of SSBs, and the first parameter having a measured value that is below a threshold value.

A non-transitory computer-readable medium storing code for wireless communication at a UE is described. The code may include instructions executable by a processor to receive configuration information for a set of multiple SSB transmissions, where a first subset of SSBs of the set of multiple SSB transmissions use a first network energy mode and a second subset of SSBs of the set of multiple SSB transmissions use a second network energy mode, measure at least a first parameter for at least a first SSB of the set of multiple SSB transmissions, and initiate a beam failure recovery procedure based on whether the first SSB is included in the first subset of SSBs or the second subset of SSBs, and the first parameter having a measured value that is below a threshold value.

In some examples of the method, apparatuses, and non-transitory computer-readable medium described herein, the second network energy mode provides SSBs of the second subset of SSBs that are transmitted at a lower power than SSBs of the first subset of SSBs, and where the UE ignores SSBs of the second subset of SSBs when initiating the beam failure recovery procedure. Some examples of the method, apparatuses, and non-transitory computer-readable medium described herein may further include operations, features, means, or instructions for selecting a first beam associated with the first SSB within the first subset of SSBs or a second beam associated with a second SSB within the second subset of SSBs for transmission of a beam failure recovery message, where the first beam or the second beam is selected irrespective of which of the first subset of SSBs or the second subset of SSBs is used to initiate the beam failure recovery procedure.

Some examples of the method, apparatuses, and non-transitory computer-readable medium described herein may further include operations, features, means, or instructions for transmitting a random access message using the selected first beam or second beam via a respective first random access channel resource associated with the first SSB or second random access channel resource associated with the second SSB, where the first random access channel resource and the second random access channel resource are each a contention-based resource or contention-free resource.

In some examples of the method, apparatuses, and non-transitory computer-readable medium described herein, the threshold value may be a first threshold value associated with the first subset of SSBs, or a second threshold value associated with the second subset of SSBs. In some examples of the method, apparatuses, and non-transitory computer-readable medium described herein, the first threshold value may be different than the second threshold value. In some examples of the method, apparatuses, and non-transitory computer-readable medium described herein, each of the first threshold value and the second threshold value may be separately configured via radio resource control signaling. In some examples of the method, apparatuses, and non-transitory computer-readable medium described herein, the first threshold value may be signaled to the UE, and the second threshold value may be based on an offset value from the first threshold value. In some examples of the method, apparatuses, and non-transitory computer-readable medium described herein, the offset value corresponds to a power offset between a first transmission power of the first subset of SSBs and a second transmission power of the second subset of SSBs. In some examples of the method, apparatuses, and non-transitory computer-readable medium described herein, the first threshold value and the second threshold value may be indicated in a master information block, in a system information block, or any combinations thereof.

Some examples of the method, apparatuses, and non-transitory computer-readable medium described herein may further include operations, features, means, or instructions for identifying a first candidate beam associated with the first SSB within the first subset of SSBs and a second candidate beam associated with a second SSB within the second subset of SSBs for transmission of a beam failure recovery message and prioritizing the first candidate beam and the second candidate beam based on the respective first network energy mode and second network energy mode, where a normal network energy mode is prioritized ahead of a power saving network energy mode. In some examples of the method, apparatuses, and non-transitory computer-readable medium described herein, the first network energy mode is a higher energy consumption mode than the second network energy mode, and the first network energy mode provides SSBs of the first subset of SSBs at a first periodicity, the UE ignores SSBs of the second subset of SSBs when initiating the beam failure recovery procedure based on the first periodicity being below a periodicity threshold, and the UE measures at least the first parameter for at least a second SSB of the second subset of SSBs based on the first periodicity being at or above the periodicity threshold. In some examples of the method, apparatuses, and non-transitory computer-readable medium described herein, the threshold value for initiating the beam failure recovery procedure may be modified when the UE measures the first parameter for the second SSB.

A method for wireless communication at a network entity is described. The method may include transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs and receiving, from the UE, a beam failure recovery message that indicates that at least a first parameter measurement of the one or more parameter measurements is below the threshold value.

An apparatus for wireless communication at a network entity is described. The apparatus may include a processor, memory coupled with the processor, and instructions stored in the memory. The instructions may be executable by the processor to cause the apparatus to transmit, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs and receive, from the UE, a beam failure recovery message that indicates that at least a first parameter measurement of the one or more parameter measurements is below the threshold value.

Another apparatus for wireless communication at a network entity is described. The apparatus may include means for transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs and means for receiving, from the UE, a beam failure recovery message that indicates that at least a first parameter measurement of the one or more parameter measurements is below the threshold value.

A non-transitory computer-readable medium storing code for wireless communication at a network entity is described. The code may include instructions executable by a processor to transmit, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs and receive, from the UE, a beam failure recovery message that indicates that at least a first parameter measurement of the one or more parameter measurements is below the threshold value.

In some examples of the method, apparatuses, and non-transitory computer-readable medium described herein, the second network energy mode provides SSBs of the second subset of SSBs that are transmitted at a lower power than SSBs of the first subset of SSBs, and where the configuration information indicates the UE is to ignore SSBs of the second subset of SSBs when initiating the beam failure recovery procedure. In some examples of the method, apparatuses, and non-transitory computer-readable medium described herein, a first beam associated with the first SSB within the first subset of SSBs or a second beam associated with a second SSB within the second subset of SSBs is selectable for transmission of the beam failure recovery message irrespective of which of the first subset of SSBs or the second subset of SSBs is used to initiate the beam failure recovery procedure.

In some examples of the method, apparatuses, and non-transitory computer-readable medium described herein, the receiving the beam failure recovery message may include operations, features, means, or instructions for receiving a random access message via the first beam or the second beam via a respective first random access channel resource associated with the first SSB or second random access channel resource associated with the second SSB, where the first random access channel resource and the second random access channel resource are each a contention-based resource or contention-free resource.

In some examples of the method, apparatuses, and non-transitory computer-readable medium described herein, the threshold value may be a first threshold value associated with the first subset of SSBs, or a second threshold value associated with the second subset of SSBs. In some examples of the method, apparatuses, and non-transitory computer-readable medium described herein, each of the first threshold value and the second threshold value may be separately configured via radio resource control signaling, or the first threshold value may be signaled to the UE and the second threshold value may be based on an offset value from the first threshold value. In some examples of the method, apparatuses, and non-transitory computer-readable medium described herein, the first threshold value and the second threshold value may be indicated in a master information block, in a system information block, or any combinations thereof.

Some examples of the method, apparatuses, and non-transitory computer-readable medium described herein may further include operations, features, means, or instructions for configuring a first candidate beam associated with the first SSB within the first subset of SSBs and a second candidate beam associated with a second SSB within the second subset of SSBs for transmission of a beam failure recovery message, and where the configuration information indicates the UE is to prioritize the first candidate beam and the second candidate beam based on the respective first network energy mode and second network energy mode, where a normal network energy mode is prioritized ahead of a power saving network energy mode. In some examples of the method, apparatuses, and non-transitory computer-readable medium described herein, the first network energy mode is a higher energy consumption mode than the second network energy mode, and the first network energy mode provides SSBs of the first subset of SSBs at a first periodicity, the UE ignores SSBs of the second subset of SSBs when initiating the beam failure recovery procedure based on the first periodicity being below a periodicity threshold, and the UE measures at least the first parameter for at least a second SSB of the second subset of SSBs based on the first periodicity being at or above the periodicity threshold.

DETAILED DESCRIPTION

Figure 1:
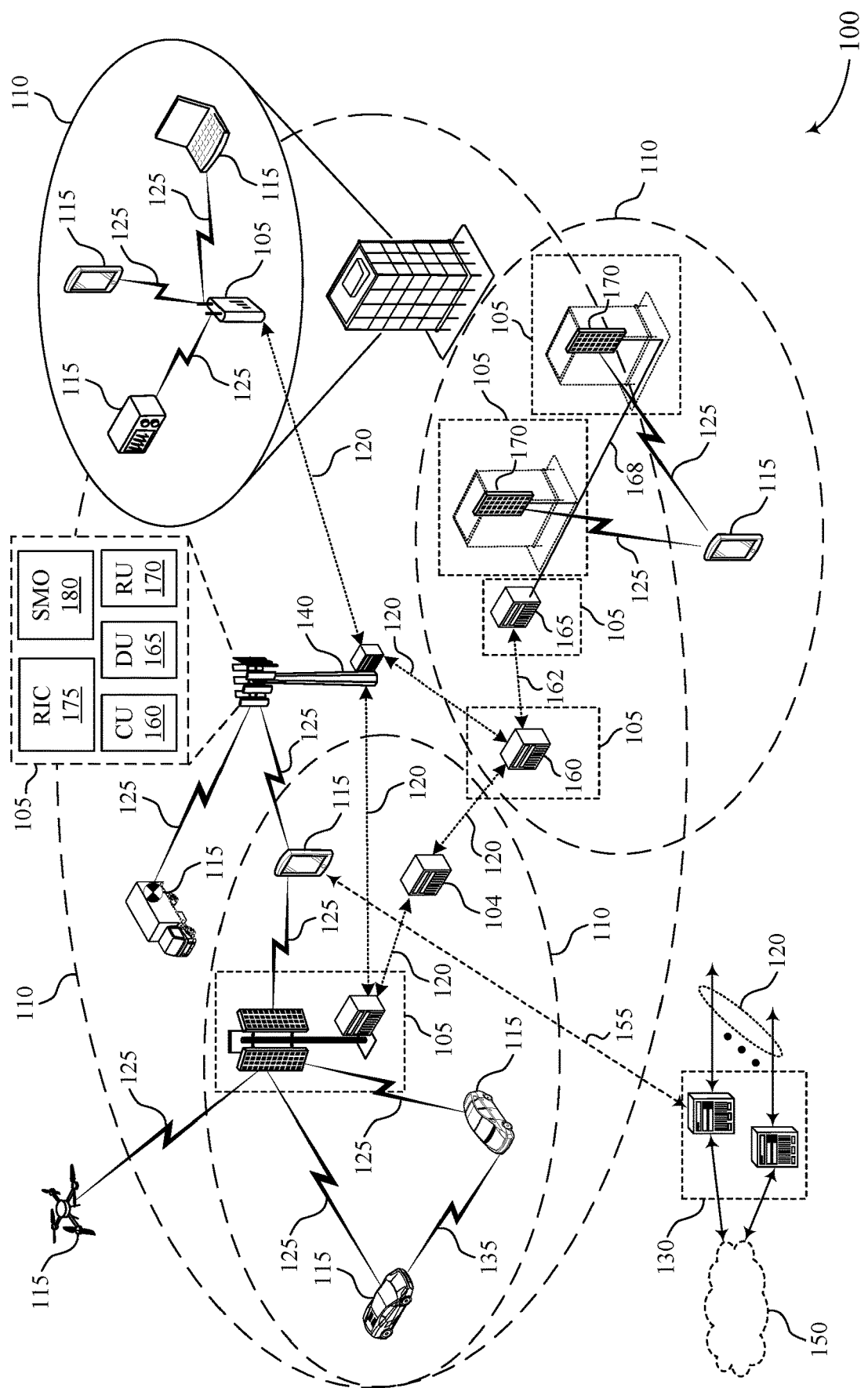
FIG. 1 shows an example of a wireless communications system that supports techniques for beam failure detection based on network energy modes in wireless communications in accordance with one or more aspects of the present disclosure.

A wireless communications system may include a communication device, such as a user equipment (UE) or a network entity (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, 5G systems (which may be referred to as NR systems), 6G systems, or other radio access technologies. The wireless communications may include uplink transmission, uplink reception, downlink transmission, or downlink reception, sidelink transmission, sidelink reception, or a combination thereof. A communication device may be configured with various circuitry to support wireless communications. In some cases, this various circuitry may include multiple circuit elements, such as multiple transmit/receive chains that each have associated power amplifier, mixer, and filtering components, among others, for example. When transmitting via multiple antenna ports, multiple active transmit chains may consume relatively large amounts of power.

In some cases, network entities may have relatively large energy consumption that may be driven in part by a relatively large quantity of antennas at a network entity (e.g., gNBs, radio heads, etc.). For example, if a network entity uses all of its antennas, energy consumption can increase by a relatively large amount relative to cases where fewer than all antennas are used for communications. Further, network entities may transmit periodic communications that support network discovery and measurement procedures, such as periodic synchronization signal block (SSB) transmissions that are transmitted using multiple transmission beams. Such periodic transmissions can further contribute to energy consumption at a network entity. In some cases, network power savings may be achieved by transmitting some SSB transmissions at a reduced power (e.g., through transmissions that use lower transmit power, or through transmissions that use fewer than all of the antennas at the network entity). In some cases, SSBs that are transmitted at a reduced power are referred to as light SSBs.

However, various radio link management (RLM) procedures may use measurements of SSBs for link evaluation and for initiating various RLM procedures. For example, a UE may perform a RLM operation (e.g., beam failure detection (BFD) and beam failure recovery (BFR) procedures, referred to collectively herein as BFR procedures) to monitor the quality of a communications link between the UE and the network entity to ensure reliable communications. In some cases, RLM may be impacted by whether the network is transmitting a light SSB (e.g., a SSB transmitted in a power saving network energy mode) or a regular SSB (e.g., a SSB transmitted in a normal network energy mode), and a light SSB may result in a higher probability of initiation of a BFR procedure.

In accordance with various aspects discussed herein, a UE may use different parameters for regulating BFR procedures under different network energy modes for SSB transmissions. For example, a UE may perform BFD/BFR using particular parameters based on the energy saving mode of the network entity. In some aspects, one or more parameters associated with BFR procedures are changed based on the energy saving mode of the network entity, such as a reference signal received power (RSRP) threshold value for declaring a BFR. In some aspects, different threshold values for declaring BFR, such as rsrp-thresholdSSB and rsrp-thresholdlightSSB parameters may be configured by radio resource control (RRC) signaling. Additionally, or alternatively, an offset value may be provided to indicate the different threshold values, such as an offset to rsrp-thresholdSSB that is used for light SSB BFR procedures. Such an offset, in some examples, may correspond to a power offset between a regular SSB (e.g., a SSB transmitted using a normal or non-energy saving network energy mode) and light SSB (e.g., a SSB transmitted using an energy saving network energy mode). In some aspects, a BFR threshold value for light SSB may be broadcast in one or more of a master information block (MIB) or a system information block (SIB). In some aspects, whether a UE uses a different threshold value for light SSB may be based on a quantity of regular SSB transmissions (e.g., a periodicity of regular SSBs or a ratio of regular SSBs to light SSBs) that are present for RLM procedures.

Techniques as discussed herein may provide for enhanced flexibility in selection of operating modes at a network entity, while providing changes to RLM operation modes in an efficient manner. Such techniques may allow network entities to reduce operating power, while providing flexible and efficient techniques to indicate operation modes and associated SSBs to served devices. Served devices may use such information to perform BFR procedures and help provide efficient and reliable RLM operations, which may enhance overall network efficiency and reliability.

Aspects of the disclosure are initially described in the context of wireless communications systems. Aspects of the disclosure are further illustrated by and described with reference to process flows, apparatus diagrams, system diagrams, and flowcharts that relate to techniques for beam failure detection based on network energy modes in wireless communications.

FIG. 1 shows an example of a wireless communications system 100 that supports techniques for beam failure detection based on network energy modes in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for beam failure detection based on network energy modes in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI)

may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, one or more network entities 105 may operate using two or more operation modes (e.g., network energy modes), where different network energy modes are associated with different energy consumption. In accordance with various aspects, a network entity 105 may provide, and a UE 115 may receive, configuration information for a set of SSB transmissions, where different subsets of SSBs use different network energy modes. A UE 115 may measure one or more parameters for at least a first SSB, and initiate a BFR procedure based at least in part on the network energy mode associated with the first SSB and a threshold value associated with the one or more parameters. In some aspects, different SSBs associated with different network energy modes may use different parameter thresholds for initiating the BFR procedure.

Figure 2:
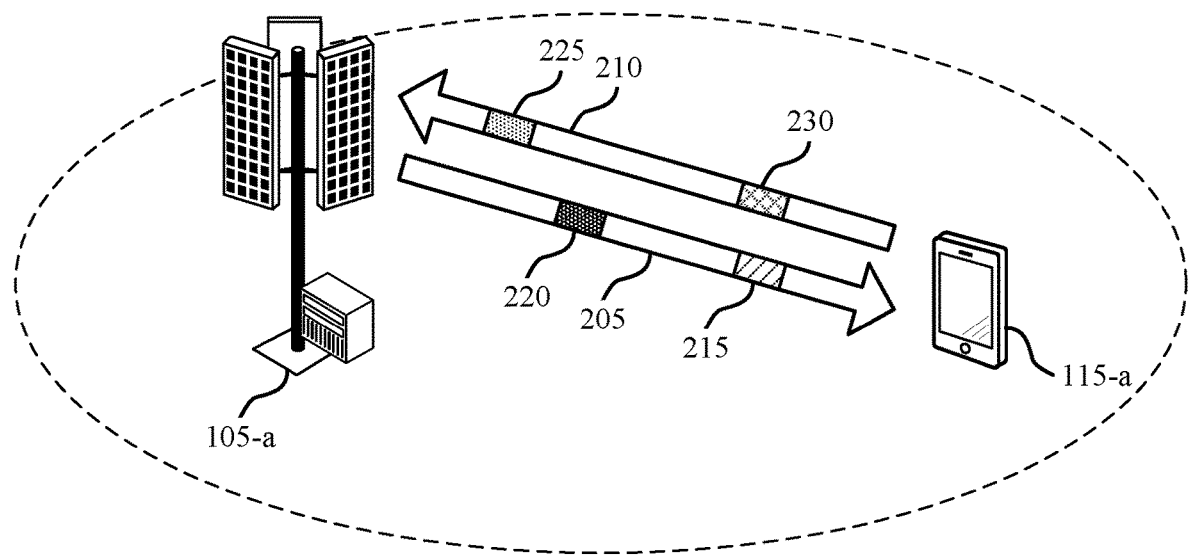
FIG. 2 shows an example of a wireless communications system that supports techniques for beam failure detection based on network energy modes in wireless communications in accordance with one or more aspects of the present disclosure.

FIG. 2 shows an example of a wireless communications system 200 that supports techniques for beam failure detection based on network energy modes in wireless communications in accordance with one or more aspects of the present disclosure. For example, the wireless communications system 200 may include a network entity 105-a and a UE 115-a, which may be examples of network entities 105 and UEs 115 as described with reference to FIG. 1. In some examples, the wireless communications system 200 may support multiple radio access technologies including 4G systems such as LTE systems, LTE-A systems, or LTE-A Pro systems, 5G systems which may be referred to as NR systems, 6G systems, or other systems. The wireless communications system 200 may support power saving, and, in some examples, may promote wireless communications in which operation modes (e.g., power saving network energy modes and normal or non-power saving network energy modes) of the network entity 105-a may be selected based at least in part on power consumption considerations, and selected operation modes signaled to the UE 115-a for use in wireless communications.

In the example of FIG. 2, the UE 115-a and network entity 105-a may communicate via at least a first link 205 which may be a downlink carrier, and a second link 210 which may be an uplink carrier. In some cases, the first link 205 and the second link 210 may use a same carrier (e.g., using TDD). In some cases, network entity 105-a may use the first link 205 to convey configuration information 215 to the UE 115-a. In some cases, the network entity 105-a may transmit operation modes configuration information to the UE 115-a in the configuration information 215. The operation modes configuration information may be transmitted, for example, using RRC signaling that provides multiple different operation modes and associated communications parameters. For example, transmission parameters for multiple different network operation modes may be provided in a table in which index values of different operation modes have associated transmission parameters, such as MCS, RV index, TB size, TB scaling factor, etc.

In accordance with various aspects discussed herein, different operation modes may be indicated in the configuration information 215, and RLM procedures may be based on transmission of one or more SSBs 220, where different SSBs 220 may be associated with different operation modes. In some cases, the UE 115-a may transmit one or more measurement reports 225 that indicate measurements associated with SSBs 220 (e.g., with parameters reported that are associated with one or more of the different SSBs, which may be adjusted or scaled based on the configuration information). In some cases, if one or more measured parameters of an SSB 220 are below a threshold value, the UE 115-a may initiate a BFR procedure and transmit a random access channel (RACH) message 230, which may initiate a BFR procedure at the network entity 105-*a* that selects a different beam for communications.

As discussed herein, different operation modes at the network entity 105-*a* may include one or more energy saving modes that reduce a transmission power or reduce a number of activated antennas for SSB 220 transmissions. In accordance with various aspects, the UE 115-*a* may use different parameters for initiating BFR under different network energy modes that are used for different SSB 220 transmissions. In some cases, one or more measurement parameters for initiating a BFR procedure may change based on the energy saving mode of the network entity 105-*a*, such as a RSRP threshold for declaring a BFR, for example. In some aspects, different threshold values for initiating a BFR procedure may include separate thresholds for different types of SSB, such as rsrp-thresholdSSB for normal SSB 220 transmissions (e.g., transmitted using regular or non-energy saving mode) and rsrp-thresholdlightSSB for light SSB 220 transmissions. In some cases, such parameters may be configured by RRC signaling. In other cases, an offset value may be provided to indicate the different threshold values, such as an offset to rsrp-thresholdSSB that is used for light SSB 220 transmissions. In some cases, the offset may correspond to a power offset of a transmission power at the network entity 105-*a* between the regular and light SSBs 220. In other cases, the threshold for light SSB 220 may be broadcast in MIB/SIB. In some aspects, whether the UE 115-*a* uses a different threshold value for light versus regular SSBs 220 is determined based on a quantity of regular SSB 220 transmissions (e.g., a periodicity of regular SSBs) that are available for measurement in RLM procedures.

In some cases, the UE 115-*a* may trigger a BFR procedure based on a hypothetical block error rate (BLER), such as a hypothetical physical downlink control channel (PDCCH) BLER of 10%. In the event of such a condition, the UE 115-*a* may scan for a new suitable beam (e.g., based on SSB or channel state information (CSI) reference signal measurements), and initiate the BFR procedure, where beams from the same cell qualify for a beam failure recovery request. In some cases, the beam failure recovery request may be transmitted using RACH message 230, which may use contention-free RACH resources (e.g., using configured RACH resources and a UE-specific configured RACH preamble) or may use contention-based RACH resources. The RACH message 230 may initiate connection using a different beam, and successful completion of the RACH procedure may conclude the BFR procedure. A failure in the BFR procedure may result in declaration of a radio link failure. In some cases, the configuration information 215 may identify a set of candidate beams for BFR, and candidate beams having a measurement above a threshold value (e.g., a SSB measurement above a RRC configured value of rsrp-ThresholdSSB) may be used for contention-free random access (CFRA) for BFR. In cases where CSI reference signal (CSI-RS) measurements are used, a same threshold may be applied after scaling a respective CSI-RS reception power based on a configured parameter (e.g., with a value provided by higher layer RRC configured parameter powerControlOffsetSS). In some cases, a time window for CFRA may be configured (e.g., by RRC configured parameter beamFailureRecoveryTimer), and based on expiration of the time window (e.g., based on an expiration of a BFR timer), the UE 115-*a* may switch to contention-based random access (CBRA) for BFR to any beam, and if either CFRA or CBRA is completed the BFR procedure is successfully completed. In some aspects, beam failure may be declared if a number of reported failure instances (e.g., based on RSRP being below a threshold) from lower layers at a medium access control (MAC) layer exceed a configured limit (e.g., a configured value for beamFrilureInstanceMaxCount) within a given time (e.g., a configured value for beamFailureDetectionTime). The time may start based on detection of a first failure instance, and may reset if the number of failure instances is less than the configured limit after expiration of the time limit. In accordance with various aspects discussed herein, one or multiple parameters associated with BFR procedures may be adjusted, or separate parameters provided, when the network entity 105-*a* uses different network operation modes to transmit SSBs 220.

Figure 3:
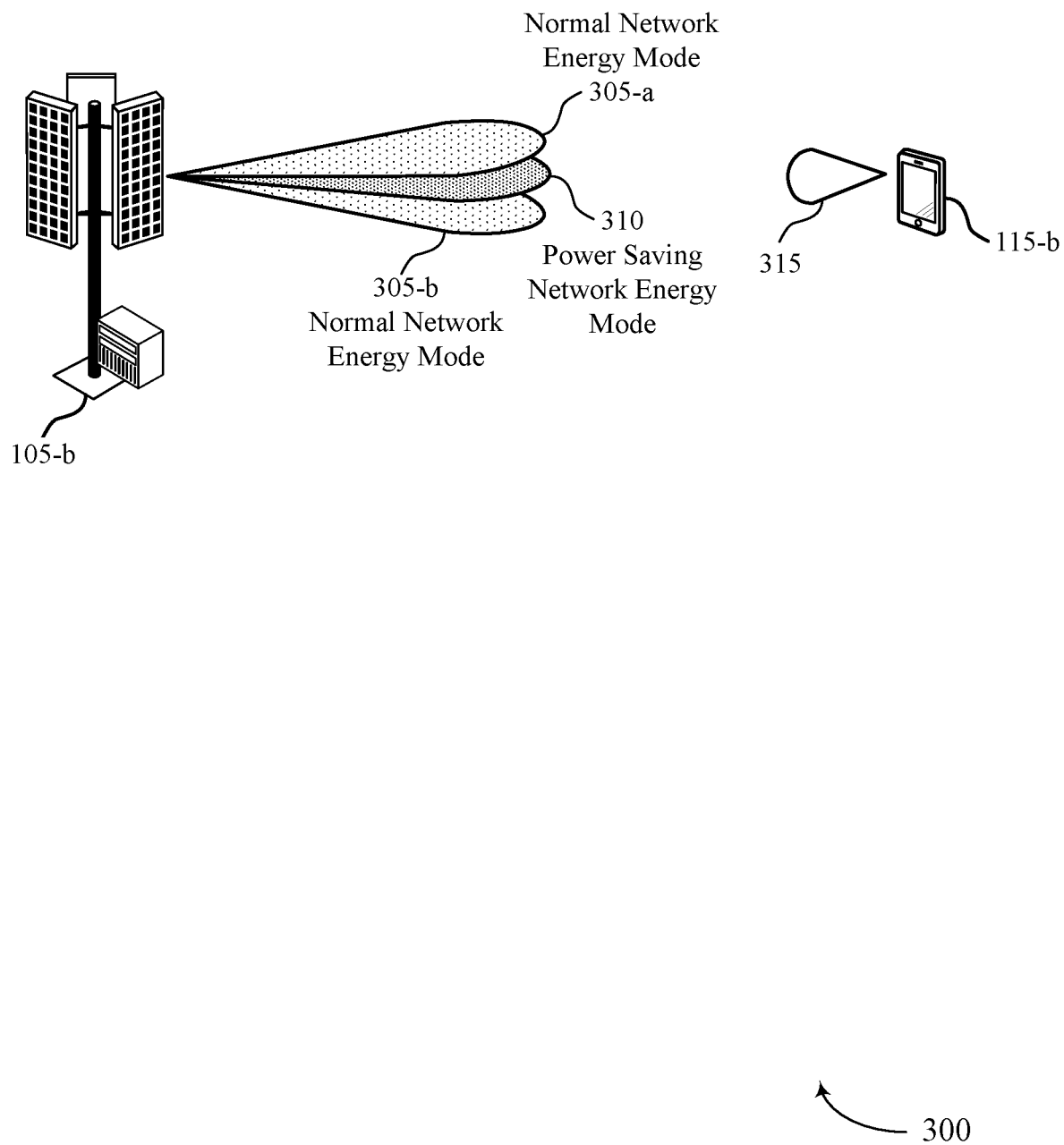
FIG. 3 shows an example of beams with different associated network energy modes that support techniques for beam failure detection based on network energy modes in wireless communications in accordance with one or more aspects of the present disclosure.

FIG. 3 shows an example of a beams with different associated network energy modes 300 that supports techniques for beam failure detection based on network energy modes in wireless communications in accordance with one or more aspects of the present disclosure. In this example, a network entity 105-*b* may configure multiple BFR-related parameters based on network energy modes, and a UE 115-*b* may perform measurements and initiate BFR procedures in accordance with the configured parameters. Network entity 105-*b* and UE 115-*b*, which may be examples of network entities 105 and UEs 115 as described herein.

In the example of FIG. 3, the network entity 105-*b* may transmit different types of SSBs based on a network energy mode. For example, a regular or normal SSB may be transmitted on beams 305-*a* and 305-*b* that use regular or normal network energy (e.g., SSBs are transmitted using all antenna elements using a regular or normal transmit power), and a power saving network energy mode (e.g., that uses less than all antenna elements, a reduced transmit power, or both) may be used to transmit light SSBs on beam 310. The UE 115-*b* may measure SSBs using a configuration associated with a UE beam 315. In some cases, the network entity 105-*b* may determine the different network energy modes based on an expected amount of traffic associated with each beam. Such light SSBs may thus reduce the network energy consumption and at the same time maintain synchronization and allow initial access. As discussed herein, in the presence of light SSBs, the UE 115-*b* may use different parameters for light SSBs and regular SSBs determine beam failure.

In some aspects, the UE 115-*b* may ignore all the light SSB blocks transmitted using beam 310 for the purposes of beam failure detection. In such cases, the UE 115-*b* does not compare the RSRP of the light SSB with any threshold to determine failure based on the light SSB. In such cases, beam failure may be determined based only on regular SSBs transmitted via beams 305-*a* and 305-*b*. In some cases, regardless of whether the light SSB is used for beam failure detection, the UE 115-*a* may still be able to perform CFRA or CBRA based on the light SSB block. In such cases, the UE 115-*b* may select a first beam associated with a measured SSB from either beams 305-*a* or 305-*b*, or beam 310, for transmission of a beam failure recovery message, where the first beam is selected irrespective of which of the first subset of SSBs or the second subset of SSBs is measured to initiate the beam failure recovery procedure.

Additionally, or alternatively, light SSBs may be used as a candidate for initiating a BFR procedures, and in such cases a different threshold for one or more measured parameters may be used to for the light SSBs compared to the normal SSBs. In some cases, the UE 115-*b* may be configured with a different RSRP threshold values for initiating BFR procedures based on light and regular SSBs (e.g., a separate RRC configured threshold, rsrp-thresholdlightSSB, may be provided; or an offset may be provided and applied to a regular SSB threshold, rsrp-thresholdSSB, to indicate the offset for the light SSB). In further cases, a same threshold may be used and a power offset between the SSB block and the light SSB block applied. In some cases, the one or more parameters associated with light SSBs may be provided via one or more broadcast communications, such as broadcasted in a MIB, a SIB, or any combinations thereof. In some further cases, both regular SSB and light SSB may co-exist and the UE 115-*b* may be configured to use both types of SSBs for initiating a BFR procedure. In such cases, the UE 115-*b* may prioritize a BFR procedure based on the regular SSB over the light SSB. For example, if the UE 115-*b* detects two beams above the threshold, and a first beam has a regular SSB and a second beam has light SSB, then the UE 115-*b* may use the regular SSB associated with the first beam for the BFR procedure. As discussed above, in some case a BFR procedure may be initiated based on a quantity of detected failure instances within a time period, and in such cases a failure may be counted for measurements associated with either a regular SSB or a light SSB.

Figure 4:
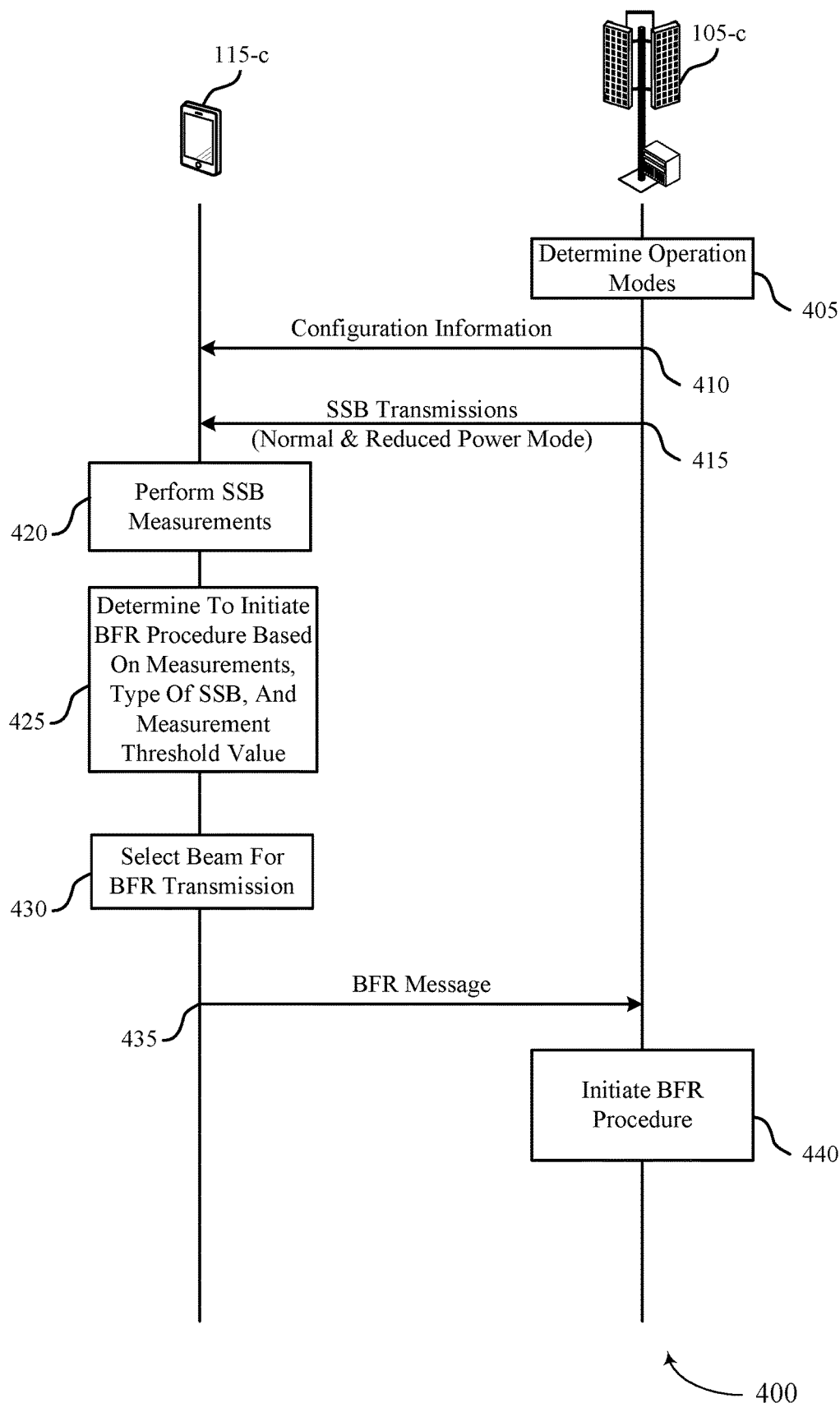
FIG. 4 shows an example of a process flow that supports techniques for beam failure detection based on network energy modes in wireless communications in accordance with one or more aspects of the present disclosure.

FIG. 4 shows an example of a process flow 400 that supports techniques for beam failure detection based on network energy modes in wireless communications in accordance with one or more aspects of the present disclosure. In some examples, the process flow 400 may implement or be implemented by aspects of UEs and network entities as described with reference to FIGS. 1 through 3. For example, the process flow 400 may be implemented by a network entity 105-*c* and a UE 115-*c*, which may be examples of a network entity 105 and a UE 115 as described with reference to FIGS. 1 through 3. The process flow 400 may be implemented by the network entity 105-*c* and the UE 115-*c* to exchange signaling to promote network entity power saving and reliable communications between one or more of the network entity 105-*c* and the UE 115-*c*. In the following description of the process flow 400, the operations between the network entity 105-*c* and the UE 115-*c* may be transmitted in a different order than the example order shown, or the operations performed by the network entity 105-*c* and the UE 115-*c* may be performed in different orders or at different times. Some operations may also be omitted from the process flow 400, and other operations may be added to the process flow 400.

At 405, the network entity 105-*c* may determine two or more operation modes for power savings and normal communications. For example, the network entity 105-*c* may determine a first operation mode for normal or regular communications in which a full set of available antenna ports may be used for communications (e.g., 32 antenna ports), and may determine a second operation mode for power savings communications in which less than the full set of available antenna ports may be used for communications (e.g., 16 antenna ports). In some cases, communications parameters may be determined for each operation mode, such as a RSRP threshold, signal to noise ratio (SNR) threshold, signal to interference and noise ratio (SINR) threshold, etc.

At 410, the network entity 105-*c* may transmit, and the UE 115-*c* may receive, configuration information. The configuration information may include operation mode information for multiple network operation modes that may include a normal network energy mode and one or more power saving network energy modes, for example. In some cases, different energy modes may be associated with different beams, and may be indicated based on a beam index (e.g., one or more beam directions based on transmission configuration indication (TCI) state may be associated with a particular network operation mode).

At 415, the network entity 105-*c* may transmit SSBs associated with each of the different energy modes. At 420, the UE 115-*c* may perform SSB measurements on one or more received SSBs. In some cases, the SSB measurements may be based on a type of SSB (e.g., a regular or normal SSB, or a light SSB).

At 425, the UE 115-*c* may determine to initiate a BFR procedure based on one or more measurements, based on a type of SSB associated with the one or more measurements, and one or more measurement threshold values. Based on the determination to initiate the BFR procedure, at 430, the UE 115-*c* may select a beam for a BFR transmission. Such a beam may be selected based on one or more measurements of the beam, based on a configured set of SSBs that are provided for BFR, or any combinations thereof.

At 435, the UE 115-*c* may transmit, and the network entity 105-*c* may receive, a BFR message. The BFR message may be transmitted, in some cases, in a RACH message transmitted by the UE 115-*c* using CFRA or CBRA. At 440, the network entity 105-*c* may initiate a BFR procedure at the network side, which may provide a beam change for communications with the UE 115-*c*.

Figure 5:
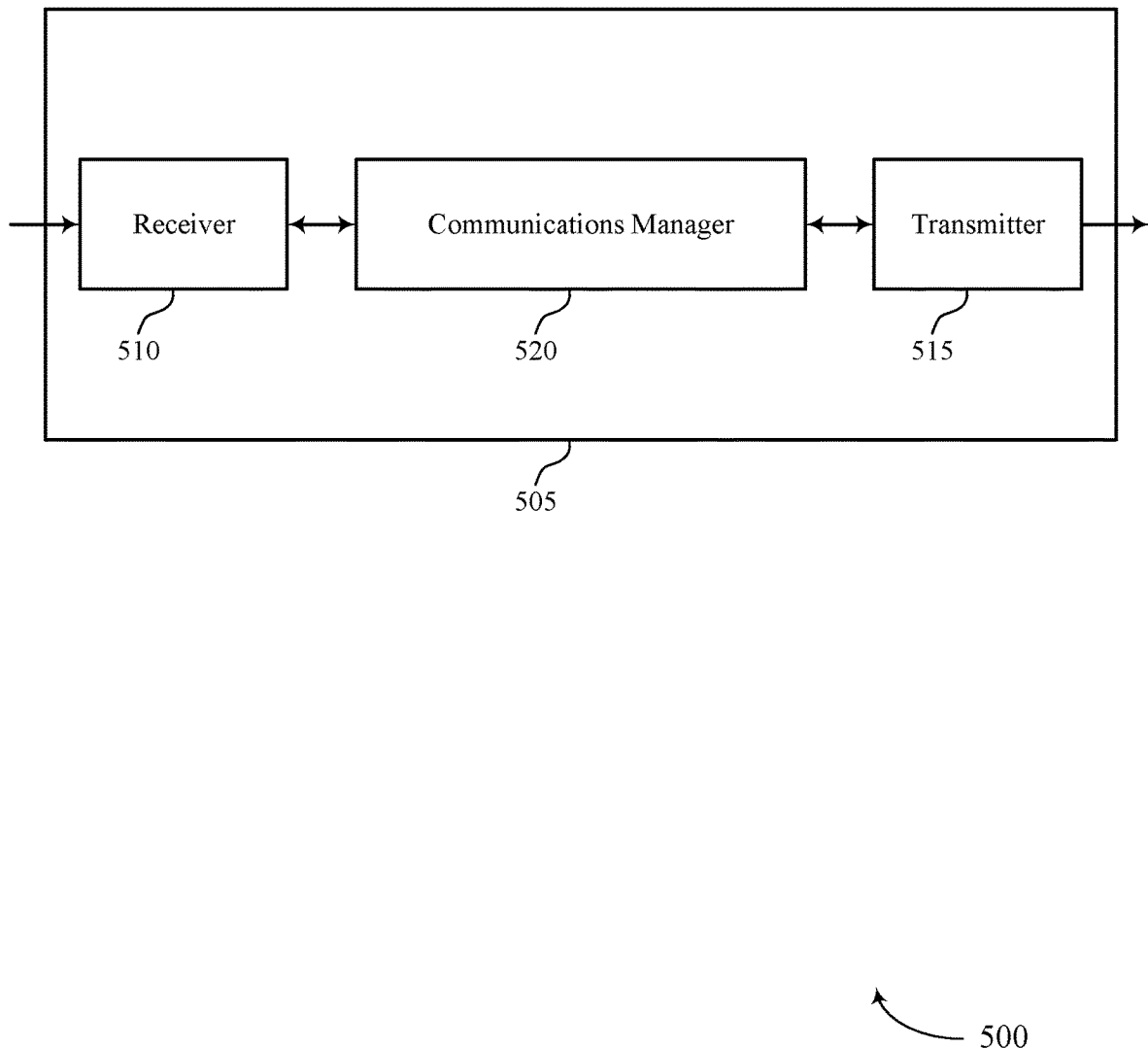
FIGS. 5 and 6 show block diagrams of devices that support techniques for beam failure detection based on network energy modes in wireless communications in accordance with one or more aspects of the present disclosure.

FIG. 5 shows a block diagram 500 of a device 505 that supports techniques for beam failure detection based on network energy modes in wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam failure detection based on network energy modes in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam failure detection based on network energy modes in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for beam failure detection based on network energy modes in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 is capable of, configured to, or operable to support a means for receiving configuration information for a set of multiple SSB transmissions, where a first subset of SSBs of the set of multiple SSB transmissions use a first network energy mode and a second subset of SSBs of the set of multiple SSB transmissions use a second network energy mode. The communications manager 520 is capable of, configured to, or operable to support a means for measuring at least a first parameter for at least a first SSB of the set of multiple SSB transmissions. The communications manager 520 is capable of, configured to, or operable to support a means for initiating a beam failure recovery procedure based on whether the first SSB is included in the first subset of SSBs or the second subset of SSBs, and the first parameter having a measured value that is below a threshold value.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for network power savings that may allow network entities to reduce operating power while providing flexible and efficient techniques to indicate operation modes and associated SSBs to UEs. UEs may use such information to perform BFR procedures, which may enhance overall network efficiency and reliability.

Figure 6:
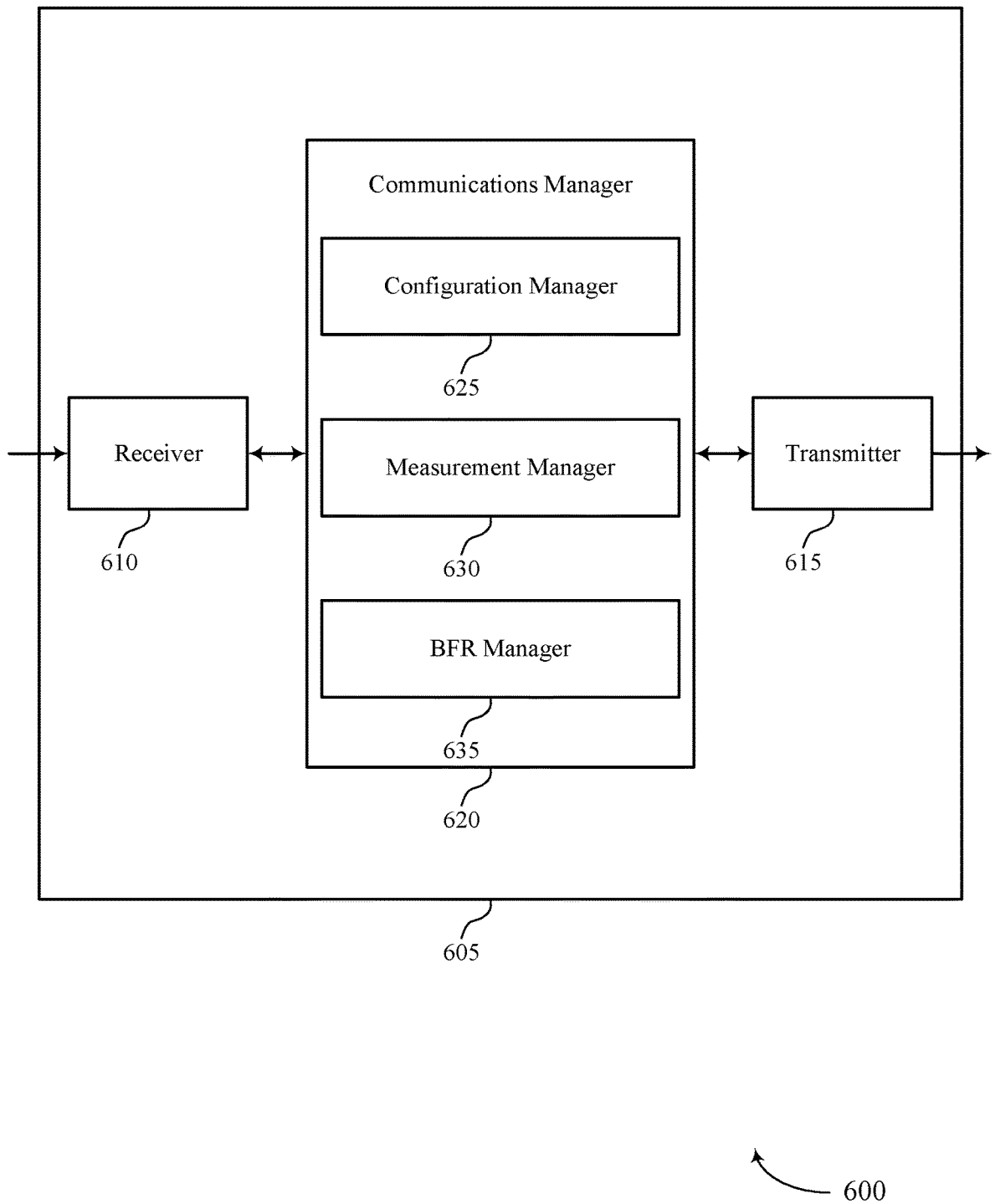

FIG. 6 shows a block diagram 600 of a device 605 that supports techniques for beam failure detection based on network energy modes in wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beam failure detection based on network energy modes in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beam failure detection based on network energy modes in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for beam failure detection based on network energy modes in wireless communications as described herein. For example, the communications manager 620 may include a configuration manager 625, a measurement manager 630, an BFR manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The configuration manager 625 is capable of, configured to, or operable to support a means for receiving configuration information for a set of multiple SSB transmissions, where a first subset of SSBs of the set of multiple SSB transmissions use a first network energy mode and a second subset of SSBs of the set of multiple SSB transmissions use a second network energy mode. The measurement manager 630 is capable of, configured to, or operable to support a means for measuring at least a first parameter for at least a first SSB of the set of multiple SSB transmissions. The BFR manager 635 is capable of, configured to, or operable to support a means for initiating a beam failure recovery procedure based on whether the first SSB is included in the first subset of SSBs or the second subset of SSBs, and the first parameter having a measured value that is below a threshold value.

Figure 7:
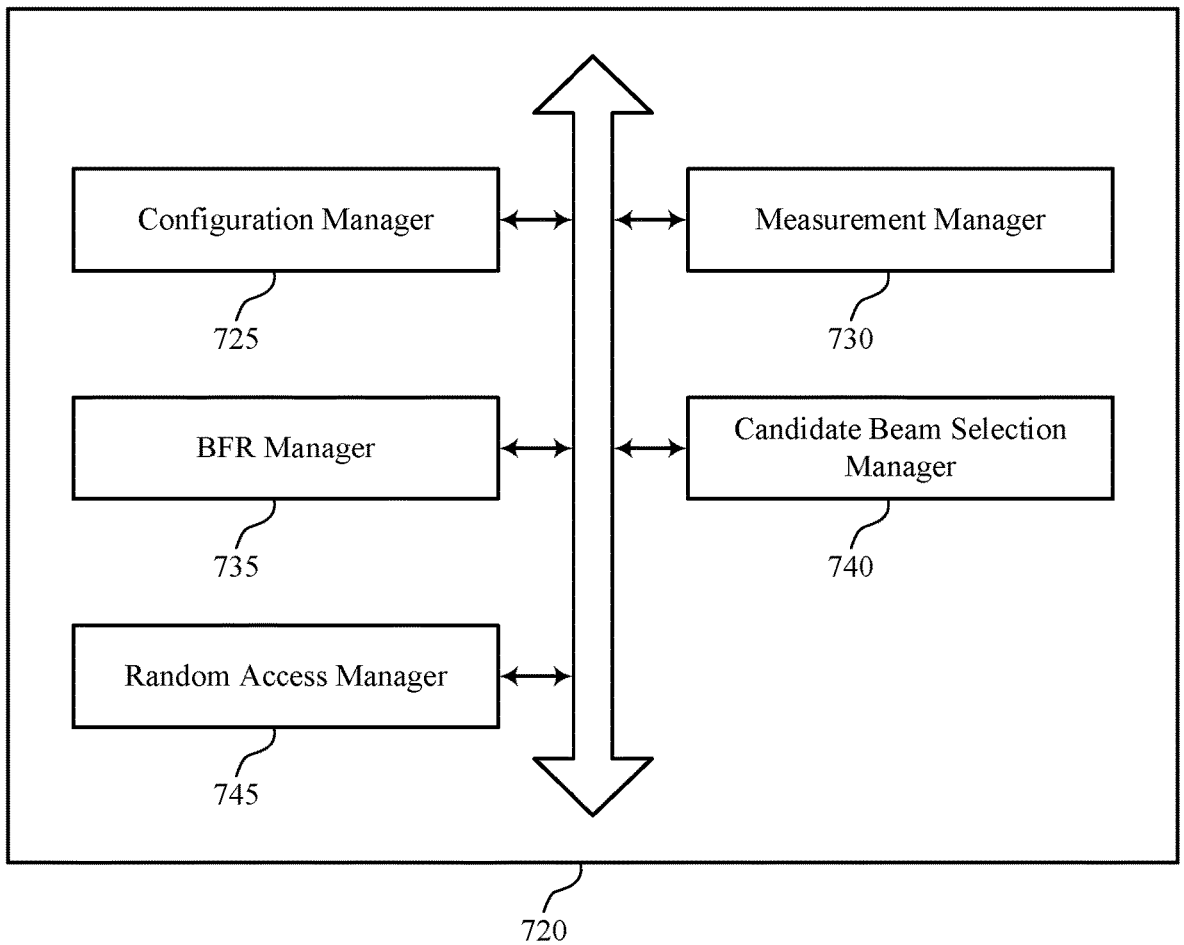
FIG. 7 shows a block diagram of a communications manager that supports techniques for beam failure detection based on network energy modes in wireless communications in accordance with one or more aspects of the present disclosure.

FIG. 7 shows a block diagram 700 of a communications manager 720 that supports techniques for beam failure detection based on network energy modes in wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for beam failure detection based on network energy modes in wireless communications as described herein. For example, the communications manager 720 may include a configuration manager 725, a measurement manager 730, an BFR manager 735, a candidate beam selection manager 740, a random access manager 745, or any combination thereof. Each of these components may communicate, directly or indirectly, with one another (e.g., via one or more buses).

The communications manager 720 may support wireless communication at a UE in accordance with examples as disclosed herein. The configuration manager 725 is capable of, configured to, or operable to support a means for receiving configuration information for a set of multiple SSB transmissions, where a first subset of SSBs of the set of multiple SSB transmissions use a first network energy mode and a second subset of SSBs of the set of multiple SSB transmissions use a second network energy mode. The measurement manager 730 is capable of, configured to, or operable to support a means for measuring at least a first parameter for at least a first SSB of the set of multiple SSB transmissions. The BFR manager 735 is capable of, configured to, or operable to support a means for initiating a beam failure recovery procedure based on whether the first SSB is included in the first subset of SSBs or the second subset of SSBs, and the first parameter having a measured value that is below a threshold value.

In some examples, the second network energy mode provides SSBs of the second subset of SSBs that are transmitted at a lower power than SSBs of the first subset of SSBs, and where the UE ignores SSBs of the second subset of SSBs when initiating the beam failure recovery procedure.

In some examples, the BFR manager 735 is capable of, configured to, or operable to support a means for selecting a first beam associated with the first SSB within the first subset of SSBs or a second beam associated with a second SSB within the second subset of SSBs for transmission of a beam failure recovery message, where the first beam or the second beam is selected irrespective of which of the first subset of SSBs or the second subset of SSBs is used to initiate the beam failure recovery procedure.

In some examples, the random access manager 745 is capable of, configured to, or operable to support a means for transmitting a random access message using the selected first beam or second beam via a respective first random access channel resource associated with the first SSB or second random access channel resource associated with the second SSB, where the first random access channel resource and the second random access channel resource are each a contention-based resource or contention-free resource.

In some examples, the threshold value is a first threshold value associated with the first subset of SSBs, or a second threshold value associated with the second subset of SSBs. In some examples, the first threshold value is different than the second threshold value. In some examples, each of the first threshold value and the second threshold value are separately configured via radio resource control signaling. In some examples, the first threshold value is signaled to the UE, and the second threshold value is based on an offset value from the first threshold value. In some examples, the offset value corresponds to a power offset between a first transmission power of the first subset of SSBs and a second transmission power of the second subset of SSBs. In some examples, the first threshold value and the second threshold value are indicated in a master information block, in a system information block, or any combinations thereof.

In some examples, the candidate beam selection manager 740 is capable of, configured to, or operable to support a means for identifying a first candidate beam associated with the first SSB within the first subset of SSBs and a second candidate beam associated with a second SSB within the second subset of SSBs for transmission of a beam failure recovery message. In some examples, the candidate beam selection manager 740 is capable of, configured to, or operable to support a means for prioritizing the first candidate beam and the second candidate beam based on the respective first network energy mode and second network energy mode, where a normal network energy mode is prioritized ahead of a power saving network energy mode.

In some examples, the first network energy mode is a higher energy consumption mode than the second network energy mode, and the first network energy mode provides SSBs of the first subset of SSBs at a first periodicity. In some examples, the UE ignores SSBs of the second subset of SSBs when initiating the beam failure recovery procedure based on the first periodicity being below a periodicity threshold. In some examples, the UE measures at least the first parameter for at least a second SSB of the second subset of SSBs based on the first periodicity being at or above the periodicity threshold. In some examples, the threshold value for initiating the beam failure recovery procedure is modified when the UE measures the first parameter for the second SSB.

Figure 8:
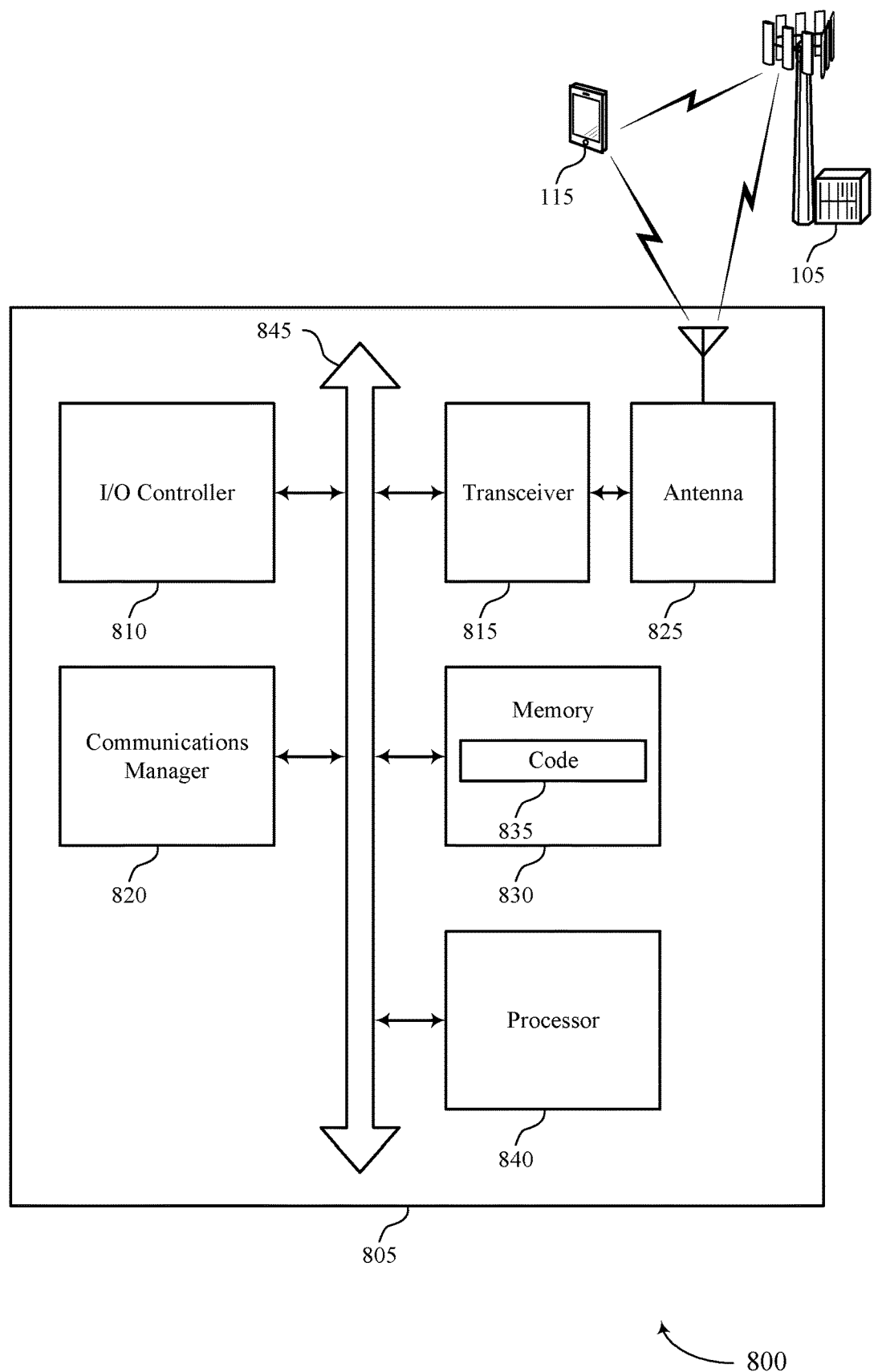
FIG. 8 shows a diagram of a system including a device that supports techniques for beam failure detection based on network energy modes in wireless communications in accordance with one or more aspects of the present disclosure.

FIG. 8 shows a diagram of a system 800 including a device 805 that supports techniques for beam failure detection based on network energy modes in wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for beam failure detection based on network energy modes in wireless communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 is capable of, configured to, or operable to support a means for receiving configuration information for a set of multiple SSB transmissions, where a first subset of SSBs of the set of multiple SSB transmissions use a first network energy mode and a second subset of SSBs of the set of multiple SSB transmissions use a second network energy mode. The communications manager 820 is capable of, configured to, or operable to support a means for measuring at least a first parameter for at least a first SSB of the set of multiple SSB transmissions. The communications manager 820 is capable of, configured to, or operable to support a means for initiating a beam failure recovery procedure based on whether the first SSB is included in the first subset of SSBs or the second subset of SSBs, and the first parameter having a measured value that is below a threshold value.

By including or configuring the communications manager 820 in accordance with examples as described herein, the device 805 may support techniques for network power savings that may allow network entities to reduce operating power while providing flexible and efficient techniques to indicate operation modes and associated SSBs to UEs. UEs may use such information to perform BFR procedures, which may enhance overall network efficiency and reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for beam failure detection based on network energy modes in wireless communications as described herein, or the processor 840 and the memory 830 may be otherwise configured to perform or support such operations.

Figure 9:
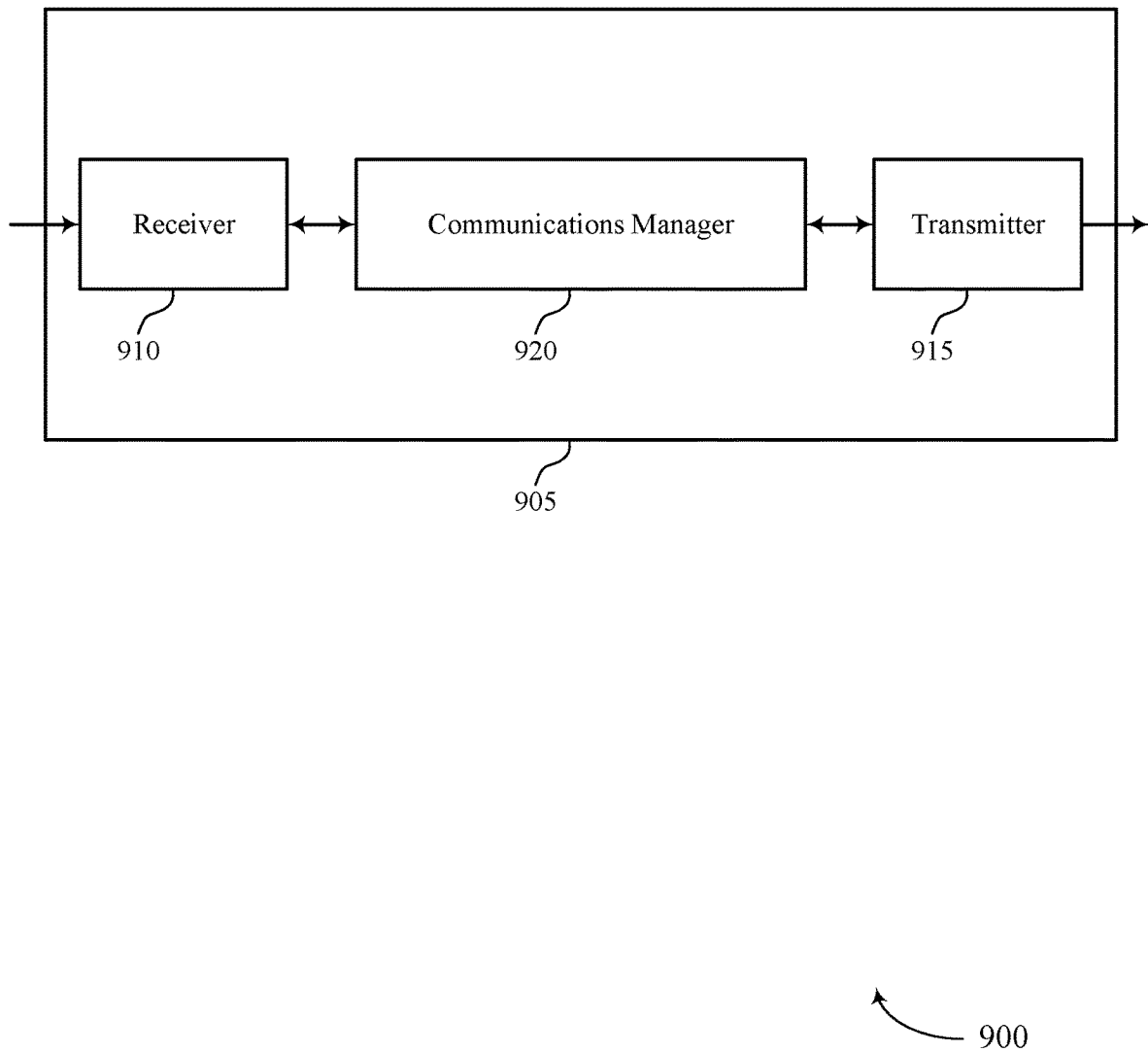
FIGS. 9 and 10 show block diagrams of devices that support techniques for beam failure detection based on network energy modes in wireless communications in accordance with one or more aspects of the present disclosure.

FIG. 9 shows a block diagram 900 of a device 905 that supports techniques for beam failure detection based on network energy modes in wireless communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for beam failure detection based on network energy modes in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 is capable of, configured to, or operable to support a means for transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs. The communications manager 920 is capable of, configured to, or operable to support a means for receiving, from the UE, a beam failure recovery message that indicates that at least a first parameter measurement of the one or more parameter measurements is below the threshold value.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for network power savings that may allow network entities to reduce operating power while providing flexible and efficient techniques to indicate operation modes and associated SSBs to UEs. UEs may use such information to perform BFR procedures, which may enhance overall network efficiency and reliability.

Figure 10:
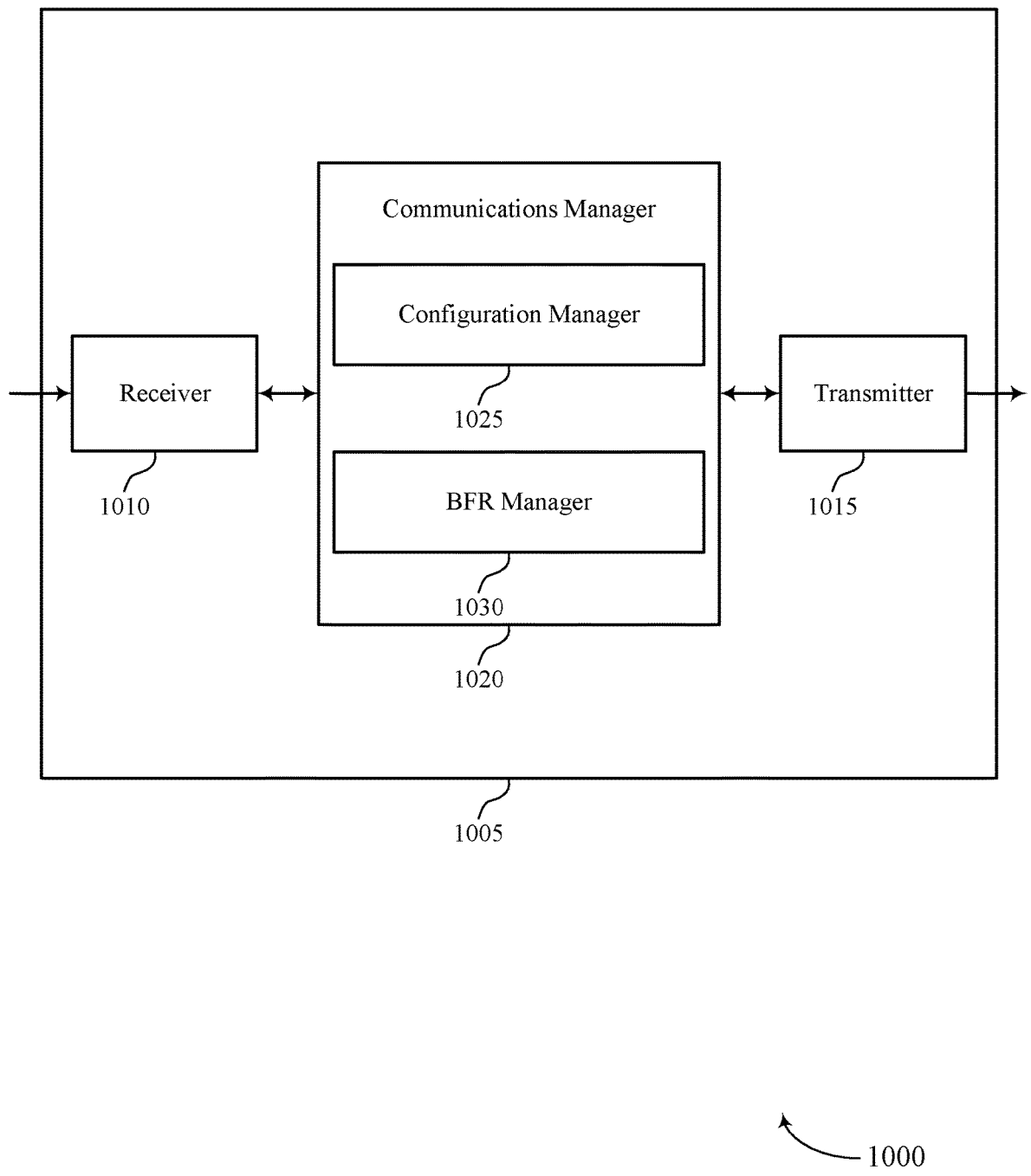

FIG. 10 shows a block diagram 1000 of a device 1005 that supports techniques for beam failure detection based on network energy modes in wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for beam failure detection based on network energy modes in wireless communications as described herein. For example, the communications manager 1020 may include a configuration manager 1025 an BFR manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration manager 1025 is capable of, configured to, or operable to support a means for transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs. The BFR manager 1030 is capable of, configured to, or operable to support a means for receiving, from the UE, a beam failure recovery message that indicates that at least a first parameter measurement of the one or more parameter measurements is below the threshold value.

Figure 11:
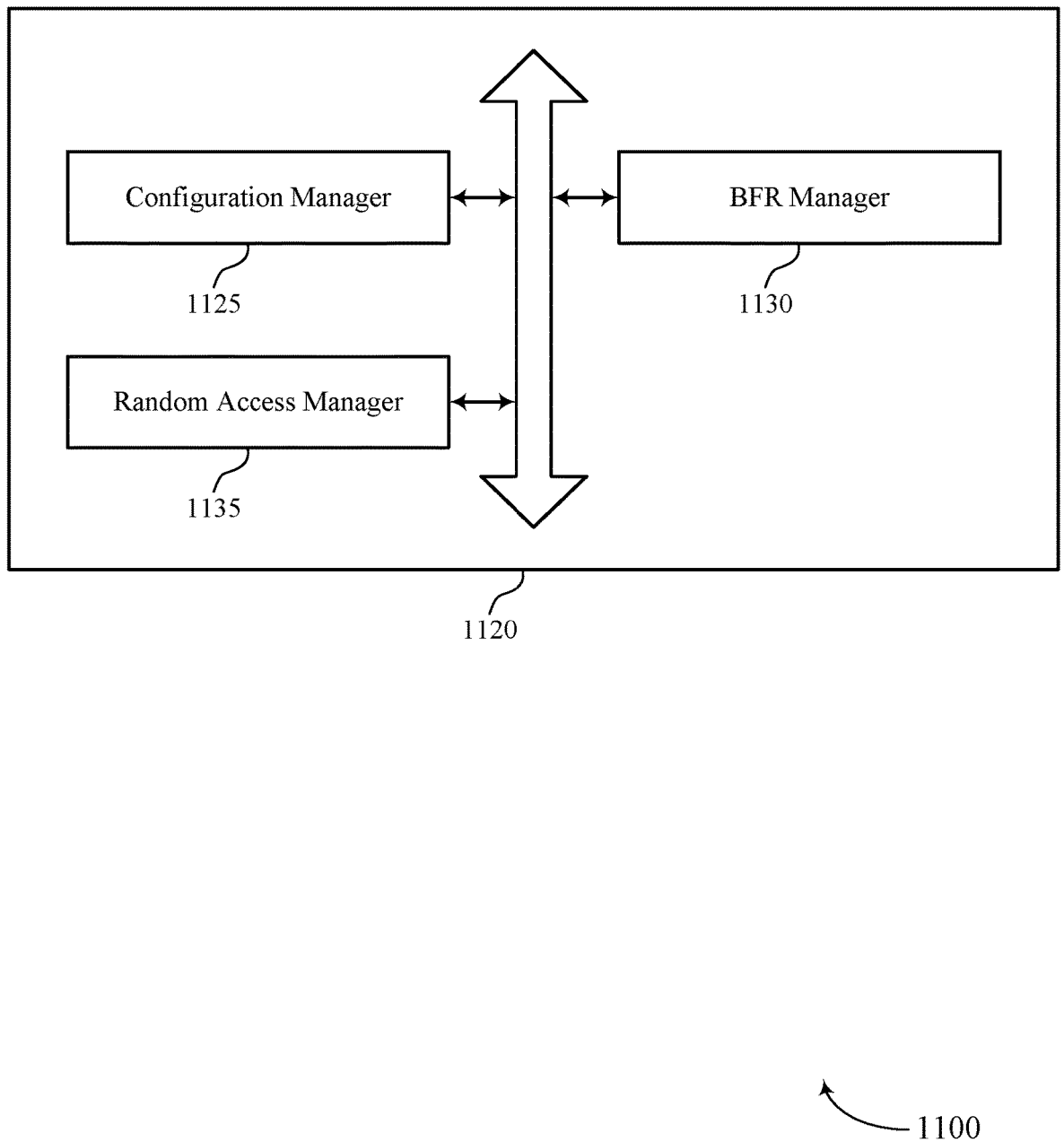
FIG. 11 shows a block diagram of a communications manager that supports techniques for beam failure detection based on network energy modes in wireless communications in accordance with one or more aspects of the present disclosure.

FIG. 11 shows a block diagram 1100 of a communications manager 1120 that supports techniques for beam failure detection based on network energy modes in wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for beam failure detection based on network energy modes in wireless communications as described herein. For example, the communications manager 1120 may include a configuration manager 1125, an BFR manager 1130, a random access manager 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration manager 1125 is capable of, configured to, or operable to support a means for transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs. The BFR manager 1130 is capable of, configured to, or operable to support a means for receiving, from the UE, a beam failure recovery message that indicates that at least a first parameter measurement of the one or more parameter measurements is below the threshold value.

In some examples, the second network energy mode provides SSBs of the second subset of SSBs that are transmitted at a lower power than SSBs of the first subset of SSBs, and where the configuration information indicates the UE is to ignore SSBs of the second subset of SSBs when initiating the beam failure recovery procedure. In some examples, a first beam associated with the first SSB within the first subset of SSBs or a second beam associated with a second SSB within the second subset of SSBs is selectable for transmission of the beam failure recovery message irrespective of which of the first subset of SSBs or the second subset of SSBs is used to initiate the beam failure recovery procedure.

In some examples, to support receiving the beam failure recovery message, the random access manager 1135 is capable of, configured to, or operable to support a means for receiving a random access message via the first beam or the second beam via a respective first random access channel resource associated with the first SSB or second random access channel resource associated with the second SSB, where the first random access channel resource and the second random access channel resource are each a contention-based resource or contention-free resource.

In some examples, the threshold value is a first threshold value associated with the first subset of SSBs, or a second threshold value associated with the second subset of SSBs. In some examples, each of the first threshold value and the second threshold value are separately configured via radio resource control signaling, or the first threshold value is signaled to the UE and the second threshold value is based on an offset value from the first threshold value. In some examples, the first threshold value and the second threshold value are indicated in a master information block, in a system information block, or any combinations thereof.

In some examples, the configuration manager 1125 is capable of, configured to, or operable to support a means for configuring a first candidate beam associated with the first SSB within the first subset of SSBs and a second candidate beam associated with a second SSB within the second subset of SSBs for transmission of a beam failure recovery message, and where the configuration information indicates the UE is to prioritize the first candidate beam and the second candidate beam based on the respective first network energy mode and second network energy mode, where a normal network energy mode is prioritized ahead of a power saving network energy mode. In some examples, the first network energy mode is a higher energy consumption mode than the second network energy mode, and the first network energy mode provides SSBs of the first subset of SSBs at a first periodicity. In some examples, the UE ignores SSBs of the second subset of SSBs when initiating the beam failure recovery procedure based on the first periodicity being below a periodicity threshold. In some examples, the UE measures at least the first parameter for at least a second SSB of the second subset of SSBs based on the first periodicity being at or above the periodicity threshold.

Figure 12:
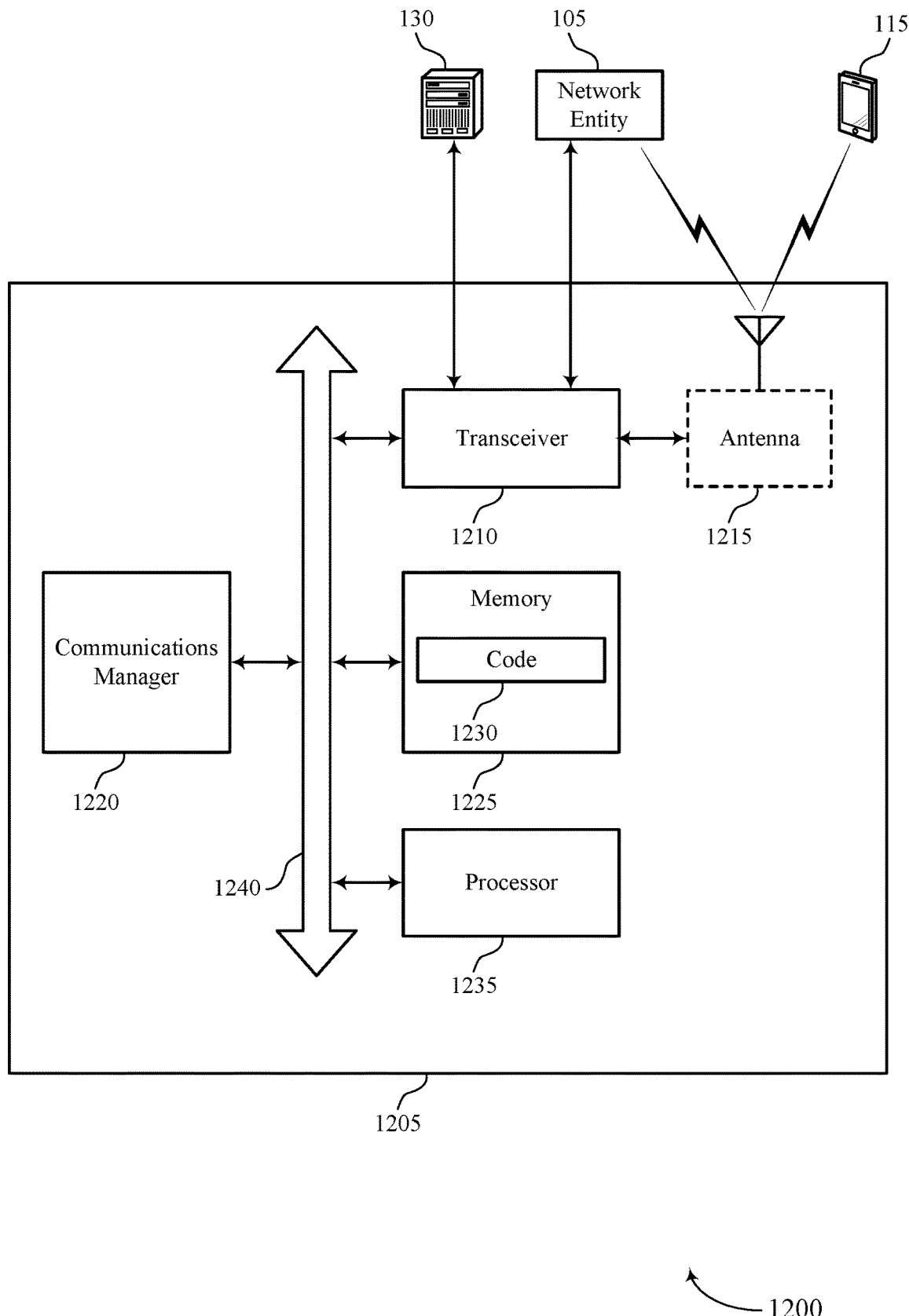
FIG. 12 shows a diagram of a system including a device that supports techniques for beam failure detection based on network energy modes in wireless communications in accordance with one or more aspects of the present disclosure.

FIG. 12 shows a diagram of a system 1200 including a device 1205 that supports techniques for beam failure detection based on network energy modes in wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for beam failure detection based on network energy modes in wireless communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 is capable of, configured to, or operable to support a means for transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs. The communications manager 1220 is capable of, configured to, or operable to support a means for receiving, from the UE, a beam failure recovery message that indicates that at least a first parameter measurement of the one or more parameter measurements is below the threshold value.

By including or configuring the communications manager 1220 in accordance with examples as described herein, the device 1205 may support techniques for network power savings that may allow network entities to reduce operating power while providing flexible and efficient techniques to indicate operation modes and associated SSBs to UEs. UEs may use such information to perform BFR procedures, which may enhance overall network efficiency and reliability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for beam failure detection based on network energy modes in wireless communications as described herein, or the processor 1235 and the memory 1225 may be otherwise configured to perform or support such operations.

Figure 13:
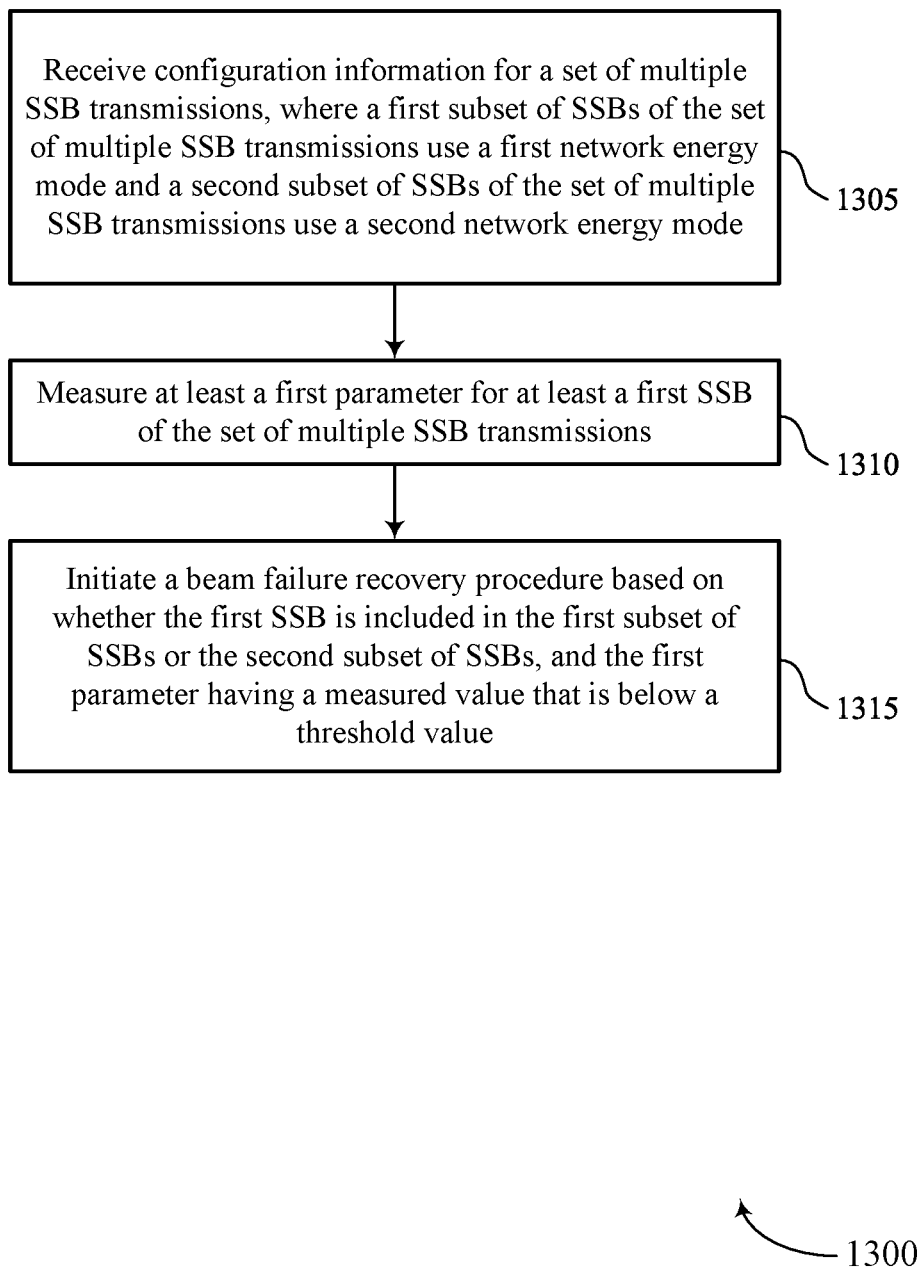
FIGS. 13 through 19 show flowcharts illustrating methods that support techniques for beam failure detection based on network energy modes in wireless communications in accordance with one or more aspects of the present disclosure.

FIG. 13 shows a flowchart illustrating a method 1300 that supports techniques for beam failure detection based on network energy modes in wireless communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1305, the method may include receiving configuration information for a set of multiple SSB transmissions, where a first subset of SSBs of the set of multiple SSB transmissions use a first network energy mode and a second subset of SSBs of the set of multiple SSB transmissions use a second network energy mode. The operations of 1305 may be performed in accordance with examples as disclosed herein. In some examples, aspects of the operations of 1305 may be performed by a configuration manager 725 as described with reference to FIG. 7.

At 1310, the method may include measuring at least a first parameter for at least a first SSB of the set of multiple SSB transmissions. The operations of 1310 may be performed in accordance with examples as disclosed herein. In some examples, aspects of the operations of 1310 may be performed by a measurement manager 730 as described with reference to FIG. 7.

At 1315, the method may include initiating a beam failure recovery procedure based on whether the first SSB is included in the first subset of SSBs or the second subset of SSBs, and the first parameter having a measured value that is below a threshold value. The operations of 1315 may be performed in accordance with examples as disclosed herein. In some examples, aspects of the operations of 1315 may be performed by an BFR manager 735 as described with reference to FIG. 7.

Figure 14:
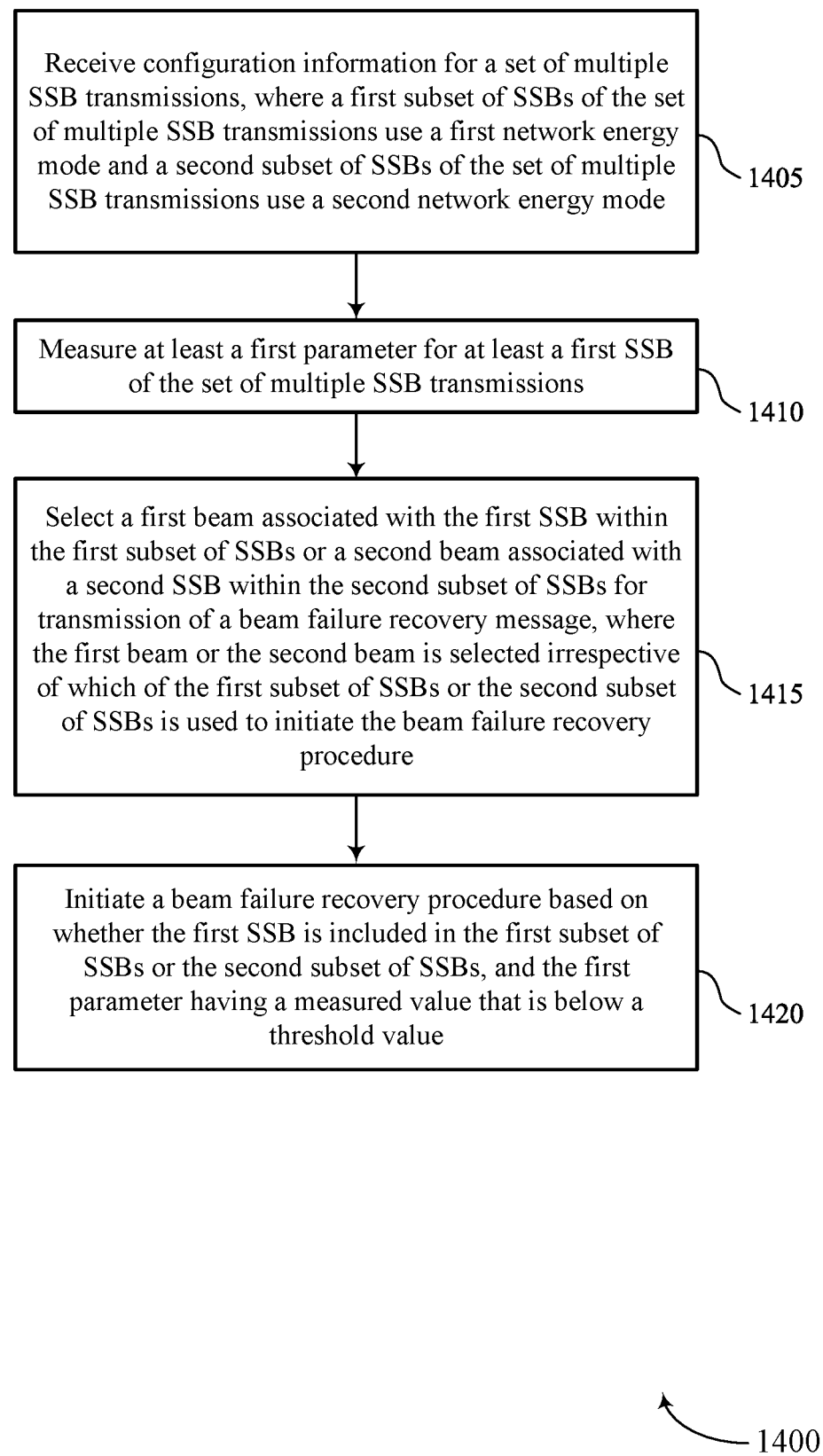

FIG. 14 shows a flowchart illustrating a method 1400 that supports techniques for beam failure detection based on network energy modes in wireless communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving configuration information for a set of multiple SSB transmissions, where a first subset of SSBs of the set of multiple SSB transmissions use a first network energy mode and a second subset of SSBs of the set of multiple SSB transmissions use a second network energy mode. The operations of 1405 may be performed in accordance with examples as disclosed herein. In some examples, aspects of the operations of 1405 may be performed by a configuration manager 725 as described with reference to FIG. 7. In some cases, the second network energy mode provides SSBs of the second subset of SSBs that are transmitted at a lower power than SSBs of the first subset of SSBs, and the UE ignores SSBs of the second subset of SSBs when initiating a beam failure recovery procedure.

At 1410, the method may include measuring at least a first parameter for at least a first SSB of the set of multiple SSB transmissions. The operations of 1410 may be performed in accordance with examples as disclosed herein. In some examples, aspects of the operations of 1410 may be performed by a measurement manager 730 as described with reference to FIG. 7.

At 1415, the method may include selecting a first beam associated with the first SSB within the first subset of SSBs or a second beam associated with a second SSB within the second subset of SSBs for transmission of a beam failure recovery message, where the first beam or the second beam is selected irrespective of which of the first subset of SSBs or the second subset of SSBs is used to initiate the beam failure recovery procedure. The operations of 1415 may be performed in accordance with examples as disclosed herein. In some examples, aspects of the operations of 1415 may be performed by an BFR manager 735 as described with reference to FIG. 7.

At 1420, the method may include initiating a beam failure recovery procedure based on whether the first SSB is included in the first subset of SSBs or the second subset of SSBs, and the first parameter having a measured value that is below a threshold value. The operations of 1420 may be performed in accordance with examples as disclosed herein. In some examples, aspects of the operations of 1420 may be performed by an BFR manager 735 as described with reference to FIG. 7.

Figure 15:
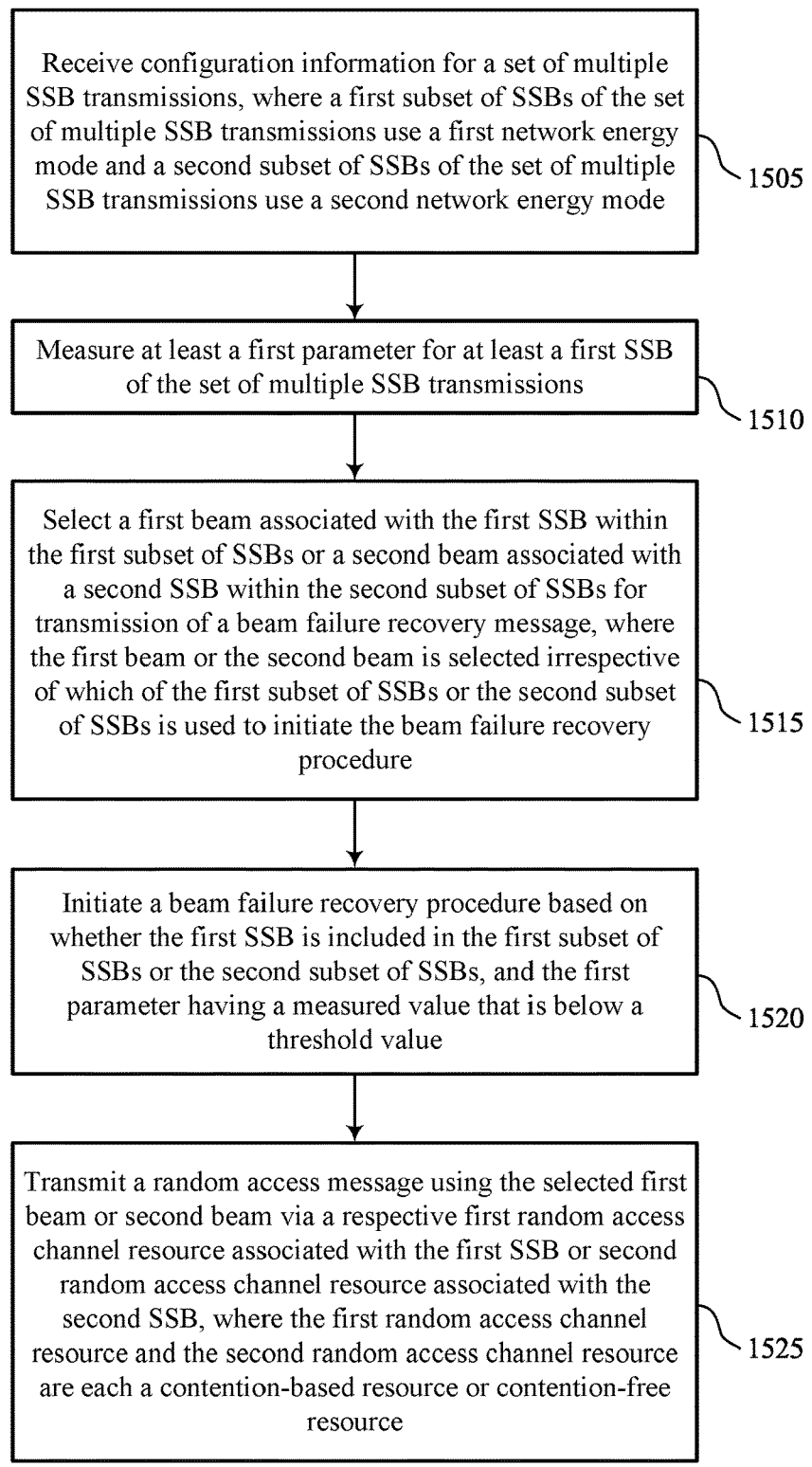

FIG. 15 shows a flowchart illustrating a method 1500 that supports techniques for beam failure detection based on network energy modes in wireless communications in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving configuration information for a set of multiple SSB transmissions, where a first subset of SSBs of the set of multiple SSB transmissions use a first network energy mode and a second subset of SSBs of the set of multiple SSB transmissions use a second network energy mode. The operations of 1505 may be performed in accordance with examples as disclosed herein. In some examples, aspects of the operations of 1505 may be performed by a configuration manager 725 as described with reference to FIG. 7.

At 1510, the method may include measuring at least a first parameter for at least a first SSB of the set of multiple SSB transmissions. The operations of 1510 may be performed in accordance with examples as disclosed herein. In some examples, aspects of the operations of 1510 may be performed by a measurement manager 730 as described with reference to FIG. 7.

At 1515, the method may include selecting a first beam associated with the first SSB within the first subset of SSBs or a second beam associated with a second SSB within the second subset of SSBs for transmission of a beam failure recovery message, where the first beam or the second beam is selected irrespective of which of the first subset of SSBs or the second subset of SSBs is used to initiate the beam failure recovery procedure. The operations of 1515 may be performed in accordance with examples as disclosed herein. In some examples, aspects of the operations of 1515 may be performed by an BFR manager 735 as described with reference to FIG. 7.

At 1520, the method may include initiating a beam failure recovery procedure based on whether the first SSB is included in the first subset of SSBs or the second subset of SSBs, and the first parameter having a measured value that is below a threshold value. The operations of 1520 may be performed in accordance with examples as disclosed herein. In some examples, aspects of the operations of 1520 may be performed by an BFR manager 735 as described with reference to FIG. 7.

At 1525, the method may include transmitting a random access message using the selected first beam or second beam via a respective first random access channel resource associated with the first SSB or second random access channel resource associated with the second SSB, where the first random access channel resource and the second random access channel resource are each a contention-based resource or contention-free resource. The operations of 1525 may be performed in accordance with examples as disclosed herein. In some examples, aspects of the operations of 1525 may be performed by a random access manager 745 as described with reference to FIG. 7.

Figure 16:
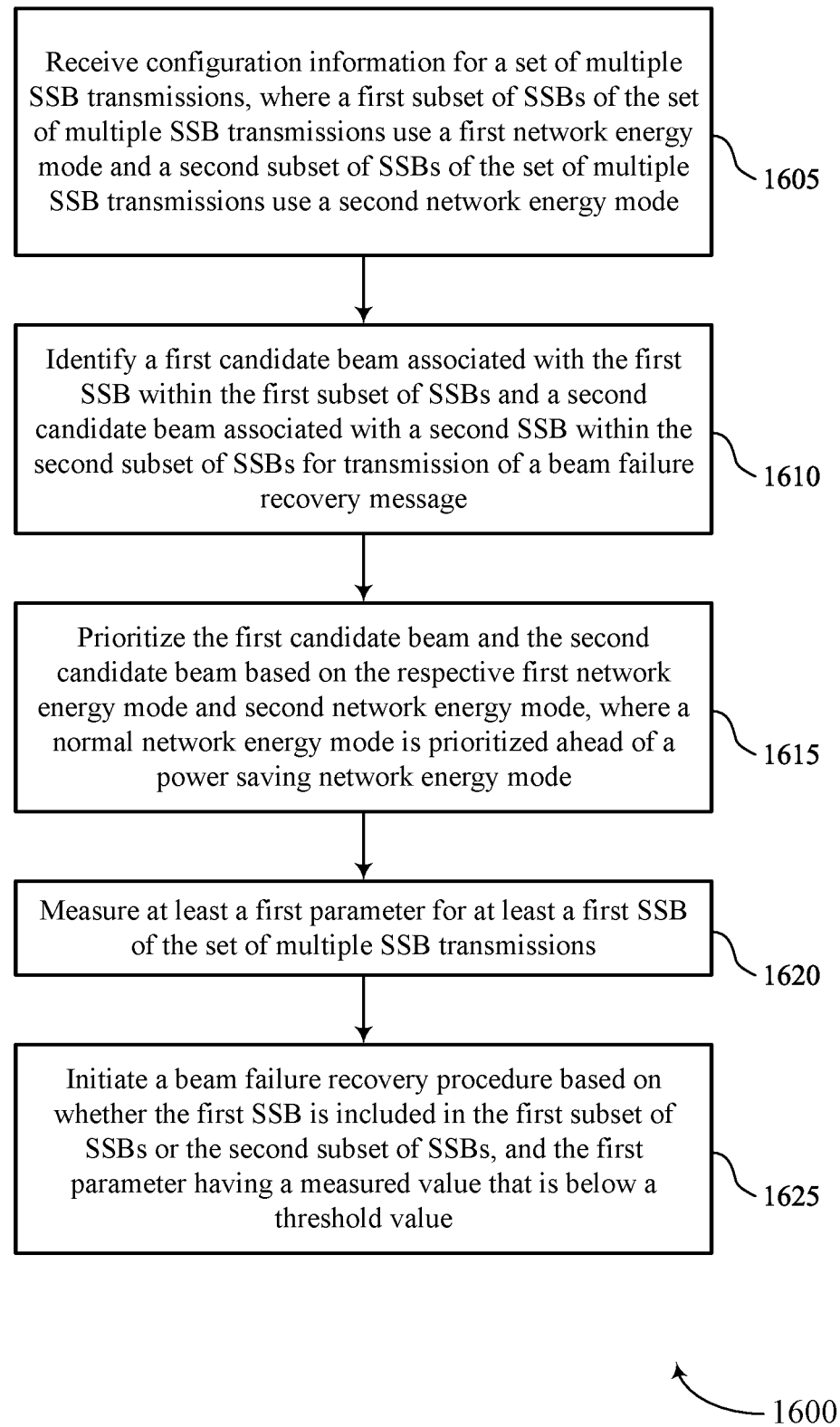

FIG. 16 shows a flowchart illustrating a method 1600 that supports techniques for beam failure detection based on network energy modes in wireless communications in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving configuration information for a set of multiple SSB transmissions, where a first subset of SSBs of the set of multiple SSB transmissions use a first network energy mode and a second subset of SSBs of the set of multiple SSB transmissions use a second network energy mode. The operations of 1605 may be performed in accordance with examples as disclosed herein. In some examples, aspects of the operations of 1605 may be performed by a configuration manager 725 as described with reference to FIG. 7.

At 1610, the method may include identifying a first candidate beam associated with the first SSB within the first subset of SSBs and a second candidate beam associated with a second SSB within the second subset of SSBs for transmission of a beam failure recovery message. The operations of 1610 may be performed in accordance with examples as disclosed herein. In some examples, aspects of the operations of 1610 may be performed by a candidate beam selection manager 740 as described with reference to FIG. 7.

At 1615, the method may include prioritizing the first candidate beam and the second candidate beam based on the respective first network energy mode and second network energy mode, where a normal network energy mode is prioritized ahead of a power saving network energy mode. The operations of 1615 may be performed in accordance with examples as disclosed herein. In some examples, aspects of the operations of 1615 may be performed by a candidate beam selection manager 740 as described with reference to FIG. 7.

At 1620, the method may include measuring at least a first parameter for at least a first SSB of the set of multiple SSB transmissions. The operations of 1620 may be performed in accordance with examples as disclosed herein. In some examples, aspects of the operations of 1620 may be performed by a measurement manager 730 as described with reference to FIG. 7.

At 1625, the method may include initiating a beam failure recovery procedure based on whether the first SSB is included in the first subset of SSBs or the second subset of SSBs, and the first parameter having a measured value that is below a threshold value. The operations of 1625 may be performed in accordance with examples as disclosed herein. In some examples, aspects of the operations of 1625 may be performed by an BFR manager 735 as described with reference to FIG. 7.

Figure 17:
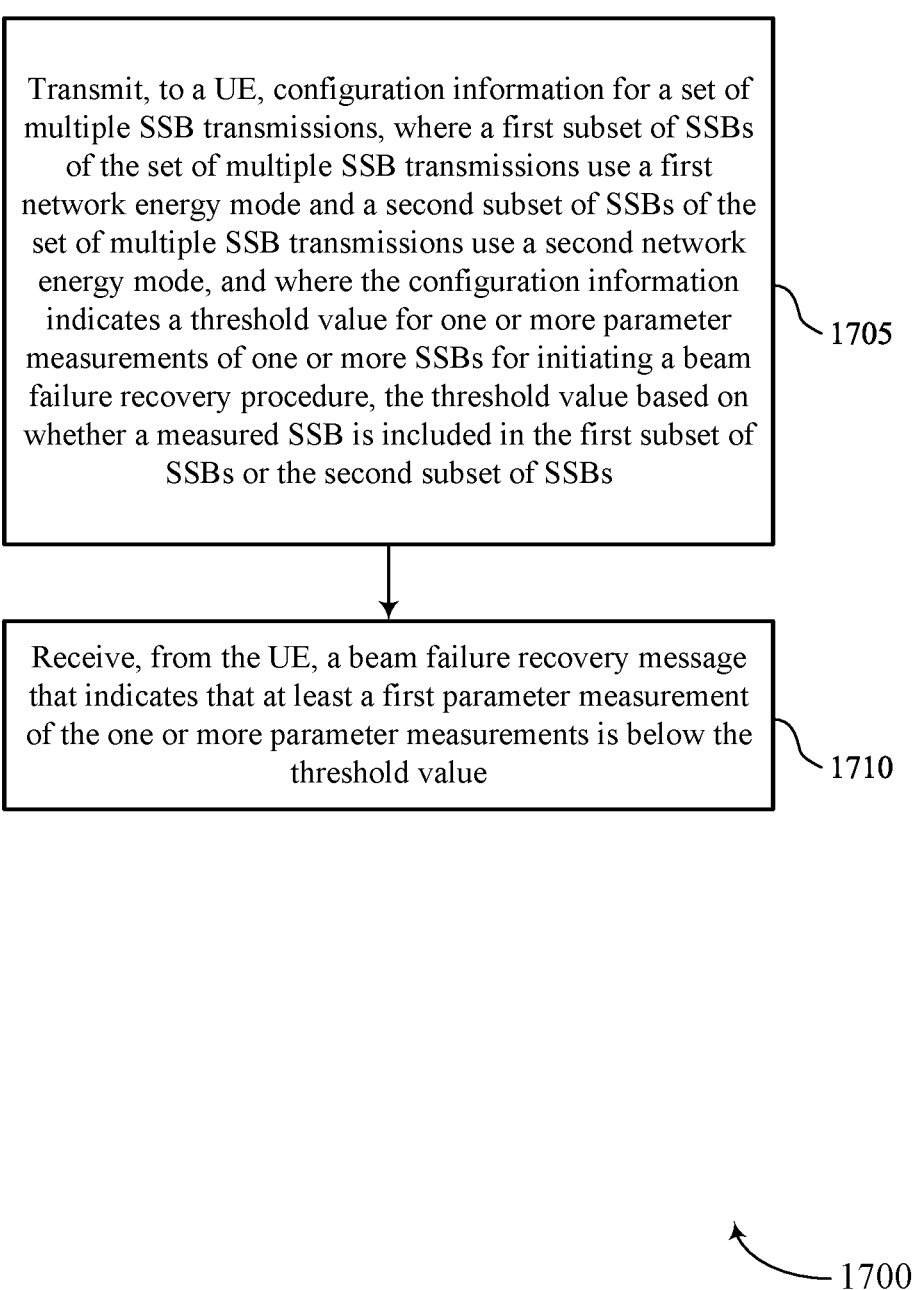

FIG. 17 shows a flowchart illustrating a method 1700 that supports techniques for beam failure detection based on network energy modes in wireless communications in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs. The operations of 1705 may be performed in accordance with examples as disclosed herein. In some examples, aspects of the operations of 1705 may be performed by a configuration manager 1125 as described with reference to FIG. 11.

At 1710, the method may include receiving, from the UE, a beam failure recovery message that indicates that at least a first parameter measurement of the one or more parameter measurements is below the threshold value. The operations of 1710 may be performed in accordance with examples as disclosed herein. In some examples, aspects of the operations of 1710 may be performed by an BFR manager 1130 as described with reference to FIG. 11.

Figure 18:
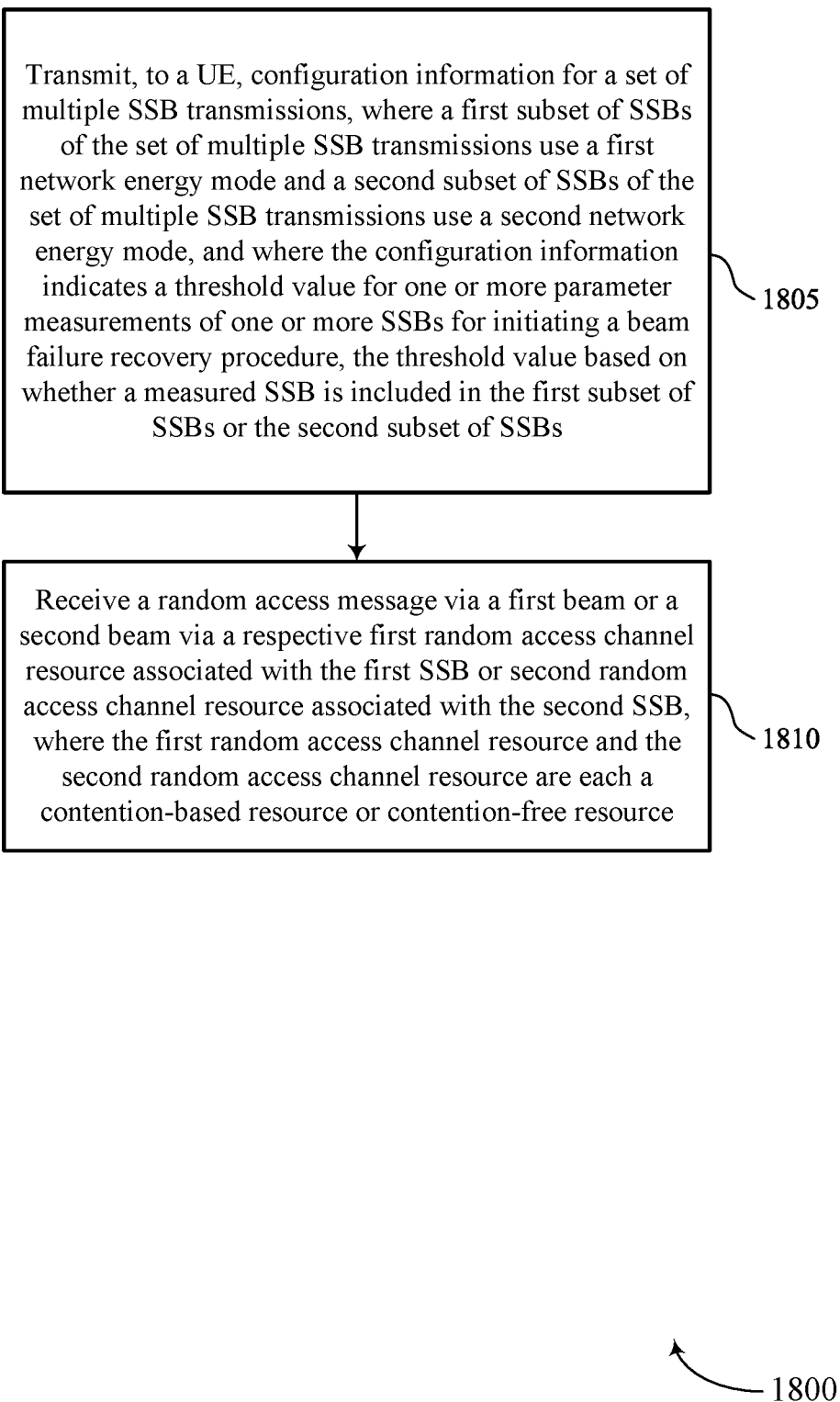

FIG. 18 shows a flowchart illustrating a method 1800 that supports techniques for beam failure detection based on network energy modes in wireless communications in accordance with aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include transmitting, to a UE, configuration information for a set of multiple SSB transmissions, where a first subset of SSBs of the set of multiple SSB transmissions use a first network energy mode and a second subset of SSBs of the set of multiple SSB transmissions use a second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs. The operations of 1805 may be performed in accordance with examples as disclosed herein. In some examples, aspects of the operations of 1805 may be performed by a configuration manager 1125 as described with reference to FIG. 11.

At 1810, the method may include receiving a random access message via a first beam or a second beam via a respective first random access channel resource associated with the first SSB or second random access channel resource associated with the second SSB, where the first random access channel resource and the second random access channel resource are each a contention-based resource or contention-free resource. The operations of 1810 may be performed in accordance with examples as disclosed herein. In some examples, aspects of the operations of 1810 may be performed by a random access manager 1135 as described with reference to FIG. 11.

Figure 19:
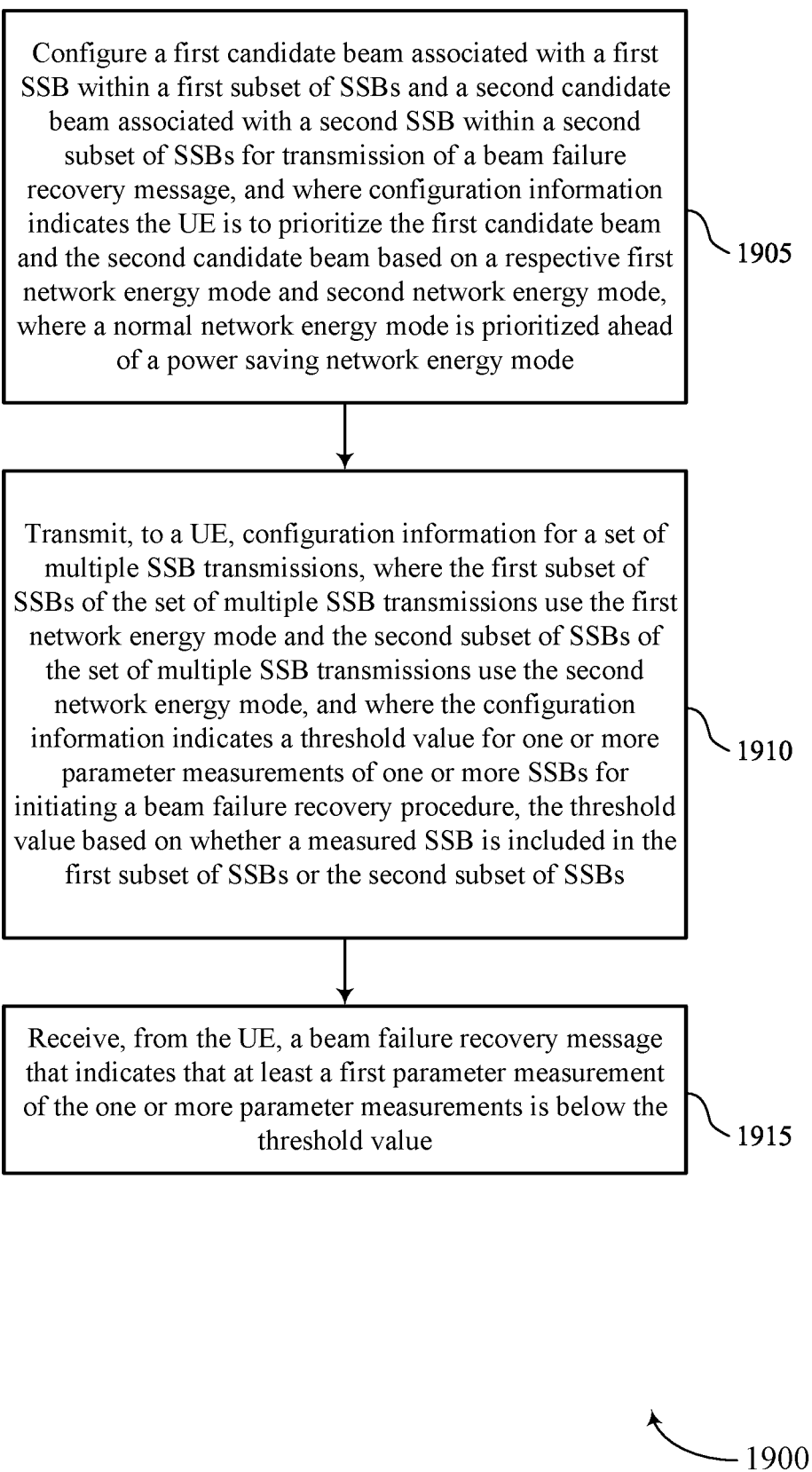

FIG. 19 shows a flowchart illustrating a method 1900 that supports techniques for beam failure detection based on network energy modes in wireless communications in accordance with aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include configuring a first candidate beam associated with a first SSB within a first subset of SSBs and a second candidate beam associated with a second SSB within a second subset of SSBs for transmission of a beam failure recovery message, and where configuration information indicates the UE is to prioritize the first candidate beam and the second candidate beam based on a respective first network energy mode and second network energy mode, where a normal network energy mode is prioritized ahead of a power saving network energy mode. The operations of 1905 may be performed in accordance with examples as disclosed herein. In some examples, aspects of the operations of 1905 may be performed by a configuration manager 1125 as described with reference to FIG. 11.

At 1910, the method may include transmitting, to a UE, configuration information for a set of multiple SSB transmissions, where the first subset of SSBs of the set of multiple SSB transmissions use the first network energy mode and the second subset of SSBs of the set of multiple SSB transmissions use the second network energy mode, and where the configuration information indicates a threshold value for one or more parameter measurements of one or more SSBs for initiating a beam failure recovery procedure, the threshold value based on whether a measured SSB is included in the first subset of SSBs or the second subset of SSBs. The operations of 1910 may be performed in accordance with examples as disclosed herein. In some examples, aspects of the operations of 1910 may be performed by a configuration manager 1125 as described with reference to FIG. 11.

At 1915, the method may include receiving, from the UE, a beam failure recovery message that indicates that at least a first parameter measurement of the one or more parameter measurements is below the threshold value. The operations of 1915 may be performed in accordance with examples as disclosed herein. In some examples, aspects of the operations of 1915 may be performed by an BFR manager 1130 as described with reference to FIG. 11.

The following provides an overview of aspects of the present disclosure:

Aspect 1: A method for wireless communication at a UE, comprising: receiving configuration information for a plurality of SSB transmissions, wherein a first subset of SSBs of the plurality of SSB transmissions use a first network energy mode and a second subset of SSBs of the plurality of SSB transmissions use a second network energy mode; measuring at least a first parameter for at least a first SSB of the plurality of SSB transmissions; and initiating a beam failure recovery procedure based at least in part on whether the first SSB is included in the first subset of SSBs or the second subset of SSBs, and the first parameter having a measured value that is below a threshold value.

Aspect 2: The method of aspect 1, wherein the second network energy mode provides SSBs of the second subset of SSBs that are transmitted at a lower power than SSBs of the first subset of SSBs, and wherein the UE ignores SSBs of the second subset of SSBs when initiating the beam failure recovery procedure.

Aspect 3: The method of aspect 2, further comprising: selecting a first beam associated with the first SSB within the first subset of SSBs or a second beam associated with a second SSB within the second subset of SSBs for transmission of a beam failure recovery message, wherein the first beam or the second beam is selected irrespective of which of the first subset of SSBs or the second subset of SSBs is used to initiate the beam failure recovery procedure.

Aspect 4: The method of aspect 3, further comprising: transmitting a random access message using the selected first beam or second beam via a respective first random access channel resource associated with the first SSB or second random access channel resource associated with the second SSB, wherein the first random access channel resource and the second random access channel resource are each a contention-based resource or contention-free resource.

Aspect 5: The method of any of aspects 1 through 4, wherein the threshold value is a first threshold value associated with the first subset of SSBs, or a second threshold value associated with the second subset of SSBs.

Aspect 6: The method of aspect 5, wherein the first threshold value is different than the second threshold value.

Aspect 7: The method of any of aspects 5 through 6, wherein each of the first threshold value and the second threshold value are separately configured via radio resource control signaling.

Aspect 8: The method of any of aspects 5 through 7, wherein the first threshold value is signaled to the UE, and the second threshold value is based at least in part on an offset value from the first threshold value.

Aspect 9: The method of aspect 8, wherein the offset value corresponds to a power offset between a first transmission power of the first subset of SSBs and a second transmission power of the second subset of SSBs.

Aspect 10: The method of any of aspects 5 through 9, wherein the first threshold value and the second threshold value are indicated in a master information block, in a system information block, or any combinations thereof.

Aspect 11: The method of any of aspects 1 through 10, further comprising: identifying a first candidate beam associated with the first SSB within the first subset of SSBs and a second candidate beam associated with a second SSB within the second subset of SSBs for transmission of a beam failure recovery message; and prioritizing the first candidate beam and the second candidate beam based on the respective first network energy mode and second network energy mode, wherein a normal network energy mode is prioritized ahead of a power saving network energy mode.

Aspect 12: The method of any of aspects 1 through 11, wherein the first network energy mode is a higher energy consumption mode than the second network energy mode, and the first network energy mode provides SSBs of the first subset of SSBs at a first periodicity, the UE ignores SSBs of the second subset of SSBs when initiating the beam failure recovery procedure based at least in part on the first periodicity being below a periodicity threshold, and the UE measures at least the first parameter for at least a second SSB of the second subset of SSBs based at least in part on the first periodicity being at or above the periodicity threshold.

Aspect 13: The method of aspect 12, wherein the threshold value for initiating the beam failure recovery procedure is modified when the UE measures the first parameter for the second SSB.

Aspect 14: A method for wireless communication at a network entity, comprising: transmitting, to a UE, configuration information for a plurality of SSB transmissions, wherein a first subset of SSBs of the plurality of SSB transmissions use a first network energy mode and a second subset of SSBs of the plurality of SSB transmissions use a second network energy mode, and wherein the configuration information indicates a threshold value for one or more parameter measurements of one or more SSBs for initiating a beam failure recovery procedure, the threshold value based at least in part on whether a measured SSB is included in the first subset of SSBs or the second subset of SSBs; and receiving, from the UE, a beam failure recovery message that indicates that at least a first parameter measurement of the one or more parameter measurements is below the threshold value.

Aspect 15: The method of aspect 14, wherein the second network energy mode provides SSBs of the second subset of SSBs that are transmitted at a lower power than SSBs of the first subset of SSBs, and wherein the configuration information indicates the UE is to ignore SSBs of the second subset of SSBs when initiating the beam failure recovery procedure.

Aspect 16: The method of aspect 15, wherein a first beam associated with the first SSB within the first subset of SSBs or a second beam associated with a second SSB within the second subset of SSBs is selectable for transmission of the beam failure recovery message irrespective of which of the first subset of SSBs or the second subset of SSBs is used to initiate the beam failure recovery procedure.

Aspect 17: The method of aspect 16, wherein the receiving the beam failure recovery message comprises: receiving a random access message via the first beam or the second beam via a respective first random access channel resource associated with the first SSB or second random access channel resource associated with the second SSB, wherein the first random access channel resource and the second random access channel resource are each a contention-based resource or contention-free resource.

Aspect 18: The method of any of aspects 14 through 17, wherein the threshold value is a first threshold value associated with the first subset of SSBs, or a second threshold value associated with the second subset of SSBs.

Aspect 19: The method of aspect 18, wherein each of the first threshold value and the second threshold value are separately configured via radio resource control signaling, or the first threshold value is signaled to the UE and the second threshold value is based at least in part on an offset value from the first threshold value.

Aspect 20: The method of any of aspects 18 through 19, wherein the first threshold value and the second threshold value are indicated in a master information block, in a system information block, or any combinations thereof.

Aspect 21: The method of any of aspects 14 through 20, further comprising: configuring a first candidate beam associated with the first SSB within the first subset of SSBs and a second candidate beam associated with a second SSB within the second subset of SSBs for transmission of a beam failure recovery message, and wherein the configuration information indicates the UE is to prioritize the first candidate beam and the second candidate beam based on the respective first network energy mode and second network energy mode, wherein a normal network energy mode is prioritized ahead of a power saving network energy mode.

Aspect 22: The method of any of aspects 14 through 21, wherein the first network energy mode is a higher energy consumption mode than the second network energy mode, and the first network energy mode provides SSBs of the first subset of SSBs at a first periodicity, the UE ignores SSBs of the second subset of SSBs when initiating the beam failure recovery procedure based at least in part on the first periodicity being below a periodicity threshold, and the UE measures at least the first parameter for at least a second SSB of the second subset of SSBs based at least in part on the first periodicity being at or above the periodicity threshold.

Aspect 23: An apparatus for wireless communication at a UE, comprising a processor; memory coupled with the processor; and instructions stored in the memory and executable by the processor to cause the apparatus to perform a method of any of aspects 1 through 13.

Aspect 24: An apparatus for wireless communication at a UE, comprising at least one means for performing a method of any of aspects 1 through 13.

Aspect 25: A non-transitory computer-readable medium storing code for wireless communication at a UE, the code comprising instructions executable by a processor to perform a method of any of aspects 1 through 13.

Aspect 26: An apparatus for wireless communication at a network entity, comprising a processor; memory coupled with the processor; and instructions stored in the memory and executable by the processor to cause the apparatus to perform a method of any of aspects 14 through 22.

Aspect 27: An apparatus for wireless communication at a network entity, comprising at least one means for performing a method of any of aspects 14 through 22.

Aspect 28: A non-transitory computer-readable medium storing code for wireless communication at a network entity, the code comprising instructions executable by a processor to perform a method of any of aspects 14 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive configuration information for a plurality of synchronization signal block (SSB) transmissions, wherein a first subset of SSBs of the plurality of SSB transmissions use a first network energy mode and a second subset of SSBs of the plurality of SSB transmissions use a second network energy mode;
      measure at least a first parameter for at least a first SSB of the plurality of SSB transmissions; and
      initiate a beam failure recovery procedure based at least in part on whether the first SSB is included in the first subset of SSBs or the second subset of SSBs, and the first parameter having a measured value that is below a threshold value.

2. The apparatus of claim 1, wherein the second network energy mode provides SSBs of the second subset of SSBs that are transmitted at a lower power than SSBs of the first subset of SSBs, and wherein the UE ignores SSBs of the second subset of SSBs when initiating the beam failure recovery procedure.

3. The apparatus of claim 2, wherein the instructions are further executable by the processor to cause the apparatus to:
   select a first beam associated with the first SSB within the first subset of SSBs or a second beam associated with a second SSB within the second subset of SSBs for transmission of a beam failure recovery message, wherein the first beam or the second beam is selected irrespective of which of the first subset of SSBs or the second subset of SSBs is used to initiate the beam failure recovery procedure.

4. The apparatus of claim 3, wherein the instructions are further executable by the processor to cause the apparatus to:
   transmit a random access message using the selected first beam or second beam via a respective first random access channel resource associated with the first SSB or second random access channel resource associated with the second SSB, wherein the first random access channel resource and the second random access channel resource are each a contention-based resource or contention-free resource.

5. The apparatus of claim 1, wherein the threshold value is a first threshold value associated with the first subset of SSBs, or a second threshold value associated with the second subset of SSBs.

6. The apparatus of claim 5, wherein the first threshold value is different than the second threshold value.

7. The apparatus of claim 5, wherein:
   each of the first threshold value and the second threshold value are separately configured via radio resource control signaling.

8. The apparatus of claim 5, wherein the first threshold value is signaled to the UE, and the second threshold value is based at least in part on an offset value from the first threshold value.

9. The apparatus of claim 8, wherein the offset value corresponds to a power offset between a first transmission power of the first subset of SSBs and a second transmission power of the second subset of SSBs.

10. The apparatus of claim 5, wherein the first threshold value and the second threshold value are indicated in a master information block, in a system information block, or any combinations thereof.

11. The apparatus of claim 1, wherein the instructions are further executable by the processor to cause the apparatus to:
identify a first candidate beam associated with the first SSB within the first subset of SSBs and a second candidate beam associated with a second SSB within the second subset of SSBs for transmission of a beam failure recovery message; and
prioritize the first candidate beam and the second candidate beam based on the respective first network energy mode and second network energy mode, wherein a normal network energy mode is prioritized ahead of a power saving network energy mode.

12. The apparatus of claim 1, wherein:
the first network energy mode is a higher energy consumption mode than the second network energy mode, and the first network energy mode provides SSBs of the first subset of SSBs at a first periodicity,
the UE ignores SSBs of the second subset of SSBs when initiating the beam failure recovery procedure based at least in part on the first periodicity being below a periodicity threshold, and
the UE measures at least the first parameter for at least a second SSB of the second subset of SSBs based at least in part on the first periodicity being at or above the periodicity threshold.

13. The apparatus of claim 12, wherein the threshold value for initiating the beam failure recovery procedure is modified when the UE measures the first parameter for the second SSB.

14. An apparatus for wireless communication at a network entity, comprising:
a processor;
memory coupled with the processor; and
instructions stored in the memory and executable by the processor to cause the apparatus to:
transmit, to a user equipment (UE), configuration information for a plurality of synchronization signal block (SSB) transmissions, wherein a first subset of SSBs of the plurality of SSB transmissions use a first network energy mode and a second subset of SSBs of the plurality of SSB transmissions use a second network energy mode, and wherein the configuration information indicates a threshold value for one or more parameter measurements of one or more SSBs for initiating a beam failure recovery procedure, the threshold value based at least in part on whether a measured SSB is included in the first subset of SSBs or the second subset of SSBs; and
receive, from the UE, a beam failure recovery message that indicates that at least a first parameter measurement of the one or more parameter measurements is below the threshold value.

15. The apparatus of claim 14, wherein the second network energy mode provides SSBs of the second subset of SSBs that are transmitted at a lower power than SSBs of the first subset of SSBs, and wherein the configuration information indicates the UE is to ignore SSBs of the second subset of SSBs when initiating the beam failure recovery procedure.

16. The apparatus of claim 15, wherein a first beam associated with the first SSB within the first subset of SSBs or a second beam associated with a second SSB within the second subset of SSBs is selectable for transmission of the beam failure recovery message irrespective of which of the first subset of SSBs or the second subset of SSBs is used to initiate the beam failure recovery procedure.

17. The apparatus of claim 16, wherein the instructions to receive the beam failure recovery message are executable by the processor to cause the apparatus to:
receive a random access message via the first beam or the second beam via a respective first random access channel resource associated with the first SSB or second random access channel resource associated with the second SSB, wherein the first random access channel resource and the second random access channel resource are each a contention-based resource or contention-free resource.

18. The apparatus of claim 14, wherein the threshold value is a first threshold value associated with the first subset of SSBs, or a second threshold value associated with the second subset of SSBs.

19. The apparatus of claim 18, wherein each of the first threshold value and the second threshold value are separately configured via radio resource control signaling, or the first threshold value is signaled to the UE and the second threshold value is based at least in part on an offset value from the first threshold value.

20. The apparatus of claim 18, wherein the first threshold value and the second threshold value are indicated in a master information block, in a system information block, or any combinations thereof.

21. The apparatus of claim 14, wherein the instructions are further executable by the processor to cause the apparatus to:
configure a first candidate beam associated with the first SSB within the first subset of SSBs and a second candidate beam associated with a second SSB within the second subset of SSBs for transmission of a beam failure recovery message, and wherein the configuration information indicates the UE is to prioritize the first candidate beam and the second candidate beam based on the respective first network energy mode and second network energy mode, wherein a normal network energy mode is prioritized ahead of a power saving network energy mode.

22. The apparatus of claim 14, wherein:
the first network energy mode is a higher energy consumption mode than the second network energy mode, and the first network energy mode provides SSBs of the first subset of SSBs at a first periodicity,
the UE ignores SSBs of the second subset of SSBs when initiating the beam failure recovery procedure based at least in part on the first periodicity being below a periodicity threshold, and
the UE measures at least the first parameter for at least a second SSB of the second subset of SSBs based at least in part on the first periodicity being at or above the periodicity threshold.

23. A method for wireless communication at a user equipment (UE), comprising:
receiving configuration information for a plurality of synchronization signal block (SSB) transmissions, wherein a first subset of SSBs of the plurality of SSB transmissions use a first network energy mode and a second subset of SSBs of the plurality of SSB transmissions use a second network energy mode;
measuring at least a first parameter for at least a first SSB of the plurality of SSB transmissions; and
initiating a beam failure recovery procedure based at least in part on whether the first SSB is included in the first subset of SSBs or the second subset of SSBs, and the first parameter having a measured value that is below a threshold value.

24. The method of claim 23, wherein the second network energy mode provides SSBs of the second subset of SSBs that are transmitted at a lower power than SSBs of the first subset of SSBs, and wherein the UE ignores SSBs of the second subset of SSBs when initiating the beam failure recovery procedure.

25. The method of claim 24, further comprising:
selecting a first beam associated with the first SSB within the first subset of SSBs or a second beam associated with a second SSB within the second subset of SSBs for transmission of a beam failure recovery message, wherein the first beam or the second beam is selected irrespective of which of the first subset of SSBs or the second subset of SSBs is used to initiate the beam failure recovery procedure.

26. The method of claim 25, further comprising:
transmitting a random access message using the selected first beam or second beam via a respective first random access channel resource associated with the first SSB or second random access channel resource associated with the second SSB, wherein the first random access channel resource and the second random access channel resource are each a contention-based resource or contention-free resource.

27. A method for wireless communication at a network entity, comprising:
transmitting, to a user equipment (UE), configuration information for a plurality of synchronization signal block (SSB) transmissions, wherein a first subset of SSBs of the plurality of SSB transmissions use a first network energy mode and a second subset of SSBs of the plurality of SSB transmissions use a second network energy mode, and wherein the configuration information indicates a threshold value for one or more parameter measurements of one or more SSBs for initiating a beam failure recovery procedure, the threshold value based at least in part on whether a measured SSB is included in the first subset of SSBs or the second subset of SSBs; and
receiving, from the UE, a beam failure recovery message that indicates that at least a first parameter measurement of the one or more parameter measurements is below the threshold value.

28. The method of claim 27, wherein the second network energy mode provides SSBs of the second subset of SSBs that are transmitted at a lower power than SSBs of the first subset of SSBs, and wherein the configuration information indicates the UE is to ignore SSBs of the second subset of SSBs when initiating the beam failure recovery procedure.

29. The method of claim 28, wherein a first beam associated with the first SSB within the first subset of SSBs or a second beam associated with a second SSB within the second subset of SSBs is selectable for transmission of the beam failure recovery message irrespective of which of the first subset of SSBs or the second subset of SSBs is used to initiate the beam failure recovery procedure.

30. The method of claim 29, wherein the receiving the beam failure recovery message comprises:
receiving a random access message via the first beam or the second beam via a respective first random access channel resource associated with the first SSB or second random access channel resource associated with the second SSB, wherein the first random access channel resource and the second random access channel resource are each a contention-based resource or contention-free resource.

* * * * *